(12) United States Patent
Nakajima et al.

(10) Patent No.: US 6,236,383 B1
(45) Date of Patent: May 22, 2001

(54) LIQUID CRYSTAL DISPLAY DEVICE AND METHOD FOR DRIVING THE SAME

(75) Inventors: Mutsumi Nakajima, Nara; Kouichi Miyachi, Tenri; Atsushi Asada, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/146,049

(22) Filed: Sep. 2, 1998

(30) Foreign Application Priority Data

Sep. 4, 1997 (JP) .................................................. 9-240083
Jun. 23, 1998 (JP) ................................................ 10-176455

(51) Int. Cl.[7] ............................................................ G09G 3/36
(52) U.S. Cl. .................................. 345/87; 345/86; 345/90
(58) Field of Search ................................ 345/107, 87, 86, 345/90

(56) References Cited

U.S. PATENT DOCUMENTS

| | | | | |
|---|---|---|---|---|
| 3,322,482 | * | 5/1967 | Harmon | 345/107 |
| 3,599,189 | * | 8/1971 | Hadden et al. | 365/173 |
| 3,750,136 | * | 7/1973 | Roess | 345/87 |
| 4,925,277 | * | 5/1990 | Inaba | 345/97 |
| 5,153,573 | * | 10/1992 | Spletter | 345/84 |
| 5,473,466 | * | 12/1995 | Tanielian et al. | 359/282 |

FOREIGN PATENT DOCUMENTS

| | | |
|---|---|---|
| 60-213924 | 10/1985 | (JP) . |
| 7-64118A | 3/1995 | (JP) . |

\* cited by examiner

*Primary Examiner*—Steven Saras
*Assistant Examiner*—William C. Spencer
(74) *Attorney, Agent, or Firm*—Nixon & Vanderhye P.C.

(57) ABSTRACT

A liquid crystal display device includes a liquid crystal layer, a row signal line, a column signal line, and a magnetic memory element, the row signal line and the column signal line being formed on one side or opposing sides of the liquid crystal layer. Magnetization of the magnetic memory element is controlled by a magnetic field generated by at least one of the row signal line and the column signal line to be in one of a magnetized state and a non-magnetized state, and a moment for driving the liquid crystal layer is generated by the magnetic memory element being retained in the magnetized state, thereby causing optical modulation in the liquid crystal layer.

28 Claims, 13 Drawing Sheets ic field, the TFTS 106 as shown in FIG. 20 are formed for

LIQUID CRYSTAL DISPLAY DEVICE AND METHOD FOR DRIVING THE SAME

BACKGROUND OF THE INVENTION

1. Field of the Invention

The present invention relates to a liquid crystal display device for use in a television set, a personal computer, a word processor, an OA (office automation) apparatus or the like, and a method for driving the same.

2. Description of the Related Art

A liquid crystal (hereinafter "LC") display device for use in a television set, a personal computer, a wordprocessor, an OA (office automation) apparatus or the like functions by utilizing the refraction anisotropy of LC molecules. Specifically, a voltage is applied to a LC layer so as to generate an electric field for causing optical modulation.

In one method for applying a voltage to the LC layer, gate lines and source lines are arranged in a matrix shape, and a pixel electrode and a thin film transistor (hereinafter referred to as "TFT") are formed at each region surrounded by a pair of gate lines and a pair of source lines. Thus, the TFT controls the voltage to be applied to the pixel electrode.

A typical example of a conventional LC display device based on the above-mentioned principle is illustrated in FIGS. 18 to 20. FIG. 18 is a cross-sectional view of the LC display device; FIG. 19 is a plan view of a matrix substrate used for the LC display device; and FIG. 20 is a cross-sectional view taken at line XX–XX' in FIG. 19.

As shown in FIG. 18, this LC display device includes a LC layer 103 filled in an interspace between a matrix substrate 101 and a counter substrate 102 (implemented as a pair of light-transmitting substrates, e.g., glass), with spherical spacers (not shown) dispersed therein.

As shown in FIG. 19, a matrix of source lines 104 and gate lines 105, TFTs 106, and pixel electrodes 107 are provided on the matrix substrate 101. To each pixel electrode 107, a voltage is applied from a source line 104 via a corresponding TFT 106. On the counter substrate 102, a light-shielding film (not shown) having an aperture corresponding to the pixel electrode, a color filter (not shown), and a counter electrode (not shown) having a planar shape are provided.

FIG. 20 shows a cross section of the TFT 106. A semiconductor layer 110 is provided on a gate electrode 108 which branches out from the gate line 104 (FIG. 19) with an insulative layer 109 interposed therebetween. A source electrode 111 and a drain electrode 112 are formed on the semiconductor layer 110.

The above-described LC display device utilizes the dielectric constant anisotropy of LC molecules.

On the other hand, a LC display device has been proposed (Japanese Laid-open Publication No. 7-64118) which utilizes a magnetic field by taking advantage of the anisotropy of magnetic susceptibility of LC molecules.

As shown in FIG. 21, this LC display device includes a LC layer 115 interposed between a pair of substrates 114, with ferromagnetic elements 113 disposed on one of the substrates 114. The LC 115 present in each region interposed between ferromagnetic elements 113 is controlled by varying the magnetization of the ferromagnetic elements 113 with an external magnetic field application means 116.

In general, the density of magnetic energy fm of LC molecules in a magnetic field can be expressed by eq. 1:

$$fm = -\tfrac{1}{2} x_\perp H^2 - \tfrac{1}{2}\Delta x(n\cdot H)^2 \qquad \text{eq. 1}$$

where $\Delta x = x\| - x\perp$: anisotropy of magnetic susceptibility;

$x\|$, $x\perp$: magnetic susceptibility; and n: orientation of LC molecules.

By applying a magnetic field to LC molecules which have a positive anisotropy of magnetic susceptibility $\Delta x$, a net magnetic moment of the LC molecules will align the LC molecules in parallel to the direction of magnetic field, hence minimizing the magnetic energy. Thus, the orientation of the LC molecules can be controlled by means of a magnetic field as well as an electric field.

In a conventional LC display device utilizing an electric field, the TFTS 106 as shown in FIG. 20 are formed for recording signal voltages corresponding to the respective electrodes. This TFT 106 acquires stable characteristics by highly accurately superposing respective patterns corresponding to the gate electrode 108, the semiconductor layer 110, the source electrodes 111, and the drain electrodes 112 upon one another. Specifically, the current value of the TFT 106 is substantially in inverse proportion with the distance between the drain electrode 112 and the source electrode 111, and parasitic capacitance is created which is substantially in proportion with the overlap between the gate electrode 108 and the source electrode 111 and/or the gate electrode 108 and the drain electrode 112. The current value and the parasitic capacitance determine the potential of the pixel.

Usually, the distance between the drain electrode 112 and the source electrode 111 is prescribed to be about 10 µm, and the overlap between the gate electrode 108 and the drain electrode 112 and/or the gate electrode 108 and the source electrode 111 is prescribed to be about 1 to 2 µm. Thus, it is necessary to control the final width of each pattern, and the overlap width between patterns, to be 1 µm or less.

In an effort to achieve such high-accuracy patterning, an exposition step is performed by, for example, employing a high precision photolithography technique which utilize an exposure apparatus including a projection lens system and a stage having a high alignment accuracy; herein, the goal is to manufacture devices under engineering conditions with a stringency of about 1 µm.

Moreover, an amorphous silicon (a-Si) is used for the semiconductor layer to form TFTs. The formation of an a-Si layer requires the use of a PE-CVD apparatus for improved layer quality.

The LC display device obtained through the aforementioned techniques provides excellent display quality in exchange for the high cost and low processing ability of the apparatuses used for manufacture (due to the use of a high precision photolithography process and a PE-CVD process). Also, strict process management is required.

Furthermore, this electric field-based conventional LC display device retains electric charges (associated with image signals) by utilizing the LC layer as a capacitor; therefore, the LC layer is required to have a high resistivity. For example, such high resistivity is needed since while driving the LC display device at a high temperature, e.g., 70° C., impurity ions may be generated within the LC layer, thereby lowering the resistivity and causing display unevenness. This may result in a reduced yield of LC display devices.

Thus, conventional LC display devices utilizing an electric field have a large problem in reducing the manufacturing cost and improving the product yield. For these reasons, LC display devices are perceived as expensive products as compared to other image display devices, e.g., CRTs, despite their thin construction, light weight, and high display quality. The high prices of LC display devices are an obstacle to gaining prevalence. Therefore, it is desired to develop a LC display device which can be produced through an easier process.

As for LC display devices utilizing a magnetic field, Japanese Laid-open Publication No. 7-64118 merely explains the principle of achieving optical modulation in LC by using a magnetic field generated by a magnetic body, but fails to disclose any structure of an actual driving means. In other words, the above literature does not describe a method for driving a matrix of pixels arranged as an image display device for use in a television set, a personal computer, a word processor, an OA apparatus, or the like. Therefore, such LC display devices are yet to replace conventional LC display devices.

SUMMARY OF THE INVENTION

According to the present invention, there is provided a liquid crystal display device including a liquid crystal layer, a row signal line, a column signal line, and a magnetic memory element, the row signal line and the column signal line being formed on one side or opposing sides of the liquid crystal layer, wherein magnetization of the magnetic memory element is controlled by a magnetic field generated by at least one of the row signal line and the column signal line to be in one of a magnetized state and a non-magnetized state, and a moment for driving the liquid crystal layer is generated by the magnetic memory element being retained in the magnetized state, thereby causing optical modulation in the liquid crystal layer.

In one embodiment of the invention, at least one of the row signal line and the column signal line is partially bent so as to have a parallel portion which is substantially parallel to the other of the row signal line and the column signal line, and the magnetic memory element is provided in a region within a range of a magnetic field generated by the parallel portion of the one of the row signal line and the column signal line and the other of the row signal line and the column signal line proximate the parallel portion.

In another embodiment of the invention, at least one of the row signal line and the column signal line is formed into a coil-like structure, and the magnetic memory element is provided in a region within a range of a magnetic field generated by the coil-like structure of the at least one of the row signal line and the column signal line and the other of the row signal line and the column signal line proximate the coil-like structure.

In still another embodiment of the invention, the magnetic memory element is provided in one of a substantially parallel orientation to the parallel portion and a substantially perpendicular orientation to the parallel portion.

In still another embodiment of the invention, the magnetic memory element has one of a general U-shape, a general C-shape, and an angular C-shape.

In still another embodiment of the invention, the magnetic memory element intersects the parallel portion in at least two positions.

In still another embodiment of the invention, a shield electrode is formed in an inner periphery of a pixel defined as one of a region surrounded by two row signal lines and two column signal lines and a region within a range of a magnetic field generated by the magnetic memory element, the shield electrode blocking an electric field generated by the row signal line and the column signal line from reaching the pixel of the liquid crystal display.

In still another embodiment of the invention, the magnetic memory element has a thickness which is substantially equal to or greater than the thickness of the liquid crystal layer.

In still another embodiment of the invention, the magnetic memory element has a magnetization easy axis along a direction substantially perpendicular to the direction of a current flowing through at least a portion of the at least one of the row signal line and the column signal line that is controlling the magnetization of the magnetic memory element.

In another aspect of the invention, there is provided a method for driving any of the said liquid crystal display devices, wherein the orientation of the liquid crystal molecules is controlled by controlling current values applied to the row signal line and the column signal line.

In one embodiment of the invention, a signal having a write period and a hold period is input to one of the row signal line and the column signal line, and an image signal is input to the other of the row signal line and the column signal line, the write period being defined as a period during which a scanning signal is fed per at least one line defined as one of a row signal line and a column signal line, and the hold period being defined as a period other than the write period.

In another embodiment of the invention, the scanning signal includes an erase signal for erasing an image signal written into the magnetic memory element and a write signal for writing an image signal into the magnetic memory element.

In still another embodiment of the invention, the erase signal includes a signal for applying to the magnetic memory element a magnetic field exceeding a saturation magnetization value of the magnetic memory element.

In still another embodiment of the invention, the write signal includes a signal for applying to the magnetic memory element a magnetic field that places the magnetic memory element substantially in the non-magnetized state.

In still another embodiment of the invention, a hold signal is applied to said one of the row signal line and the column signal line during a hold period, the hold signal including a signal which generates, when superimposed with an image signal that is input to the other of the row signal line and the column signal line during the hold period, a magnetic field not exceeding a coercive force of the magnetic memory element, and a signal that substantially minimizes change in the magnetization of the magnetic memory element.

In still another embodiment of the invention, the image signal includes a signal which generates, when superimposed with a write signal input to said one of the row signal line and the column signal line, a magnetic field that controls the magnetization of the magnetic memory element.

According to the present invention, the magnetization of a magnetic memory element is controlled in accordance with a magnetic field generated by at least one of a row signal line and a column signal line, whereby the magnetic memory element changes the orientation of LC molecules and causes optical modulation in the LC. Thus, image display can be performed while preventing display unevenness associated with a low resistivity LC layer. Since the magnetization of the magnetic memory element is controlled in accordance with a magnetic field generated by at least one of a row signal line and a column signal line, it is possible to statically-drive the LC layer while still allowing for less stringent pattern accuracy requirements for the manufacturing process and the device structure. As a result, the manufacturing cost can be reduced while improving the yield of LC display devices, so that inexpensive LC display devices can be provided.

According to the present invention, it becomes possible to easily control the magnetic field that reaches the magnetic memory element by employing a bent structure where at least one of the signal lines is partially bent so as to have a portion which is substantially parallel to the other signal line or partially overlaps the other signal line, and providing a magnetic memory element in a region within the range of magnetic field generated by such a parallel or overlapping portion of the signal line and the other signal line in that vicinity.

By forming at least one of the row signal line and the column signal line into a coil-like structure, it becomes possible to generate an intense magnetic field with a small current value, whereby the power consumption can be reduced.

By providing the magnetic memory element so as to be substantially parallel or perpendicular to the parallel or overlapping portion of the row signal line and the column signal line, it becomes possible to accurately control the magnetization of the magnetic memory element based on the current values applied to the row signal line and the column signal line.

By adopting a general U-shape, a general C-shape or an angular C-shape (e.g.,"ℶ") for the magnetic memory element, the uniformity of the magnetic field orientation within each pixel can be enhanced, whereby high-contrast image display can be achieved. Herein, any general or angular C-shape arrangement which is rotated between 0° and 360° about a pivot point is encompassed by the present invention.

By providing a magnetic memory element having a general U-shape, a general C-shape, or an angular C-shape (e.g., "ℶ") so as to intersect the parallel or overlapping portion in at least two positions, it becomes possible to effect magnetization in the same direction, i.e., along the magnetic memory element, so that magnetic field orientation within each pixel becomes uniform, whereby the magnetic field intensity can be enhanced.

In the case where a shield electrode is formed in an inner periphery of a pixel defined as a region surrounded by a pair of row signal line and a pair of column signal line or as a region within the range of magnetic field generated by the magnetic memory element, the electric field directly resulting from the row signal lines and the column signal lines is blocked by the shield electrode. This prevents the display within each pixel from being affected by increased voltages applied to the row signal line and the column signal line, so that the row signal line and the column signal line can generate a magnetic field of a sufficient intensity.

In the case where at least one of the row signal line and the column signal line, the shield electrode, the magnetic memory element, and the insulative layer interposed therebetween is formed by a printing method or a plating method, the need for film formation apparatuses or exposure apparatuses (which are expensive despite their relatively low processing ability) can be eliminated, thereby greatly reducing the manufacturing cost. The same advantage is also attained in the case of using a coating method for forming at least one of the insulative layers for insulating or isolating the row signal line and the column signal line, the shield electrode, and the magnetic memory element from one another.

By forming the magnetic memory element so as to have a thickness which is substantially equal to or greater than the thickness of the LC layer, it becomes possible to ensure that the distribution of magnetic field intensity along the thickness direction of the LC layer will have uniform horizontal components. Furthermore, since the magnetic memory elements can be utilized as spacers, it is possible to omit the step of dispersing spherical spacers as necessitated under the prior art, thereby further reducing the manufacturing cost.

By imparting the magnetic memory element with a magnetization easy axis along a direction substantially perpendicular to the direction of a current flowing through a portion or the entirety of a signal line that is controlling the magnetization thereof, it becomes possible to bring the square feature (=remnant magnetization Mr/saturation magnetization Ms) of the magnetization characteristics thereof into proximity of 1. As a result, fluctuations in magnetization are substantially prevented.

Moreover, since the magnetic memory element and the row signal line and the column signal line take the above-described relative positions, it is possible to control the orientation of the LC molecules by controlling the current values applied to the row signal line and the column signal line. As a result, the magnetic field can be controlled as desired.

By inputting to one of the row signal line and the column signal line a signal having a write period (during which a scanning signal is fed per at least one line, i.e., row or column) and a retention period (defined as any period other than the write period) and inputting an image signal to the other signal line, it becomes possible to greatly reduce the driving frequencies of various signals as compared to those required for point sequential driving.

By including an erase signal (for erasing an image signal written in the magnetic memory element) and a write signal (for writing an image signal in the magnetic memory element) in the scanning signals, it becomes possible to prevent the influences of an already-existing and possibly different image signal.

By providing that the erase signal includes a signal for applying to the magnetic memory element a magnetic field that exceeds the saturation magnetization value of the magnetic memory element, it becomes possible to maintain the magnetization of the magnetic memory element at a constant level.

By providing that the write signal includes a signal for applying to the magnetic memory element a magnetic field that places the magnetic memory element in a substantially non-magnetized state, it becomes possible to control the magnetization of the magnetic memory element to a desired state in accordance with an image signal by concurrently superimposing the magnetic field associated with the image signal.

By providing that the hold signal applied to one of the signal lines during a hold period includes a signal which generates, when superimposed with an image signal that is input during that hold period, a magnetic field not exceeding the coercive force of the magnetic memory element and includes a signal that substantially minimizes the change in the magnetization of the magnetic memory element, it becomes possible to substantially prevent the magnetization of the magnetic memory element from being changed by the magnetic field applied to the magnetic memory element during the hold period. As a result, excellent hold characteristics free of crosstalk can be obtained.

By providing that the image signal includes a signal which generates, when superimposed with a write signal, a magnetic field that controls the magnetization of the magnetic memory element, it becomes possible to arbitrarily control the magnetization of the magnetic memory element adjoining a signal line to which a write signal is fed. As a result, gray scale display can be easily attained.

Thus, the invention described herein makes possible the advantage of providing a relatively inexpensive liquid crystal display device which is free of display unevenness associated with a low resistivity LC layer, and a method for driving such a matrix type liquid crystal display device.

This and other advantages of the present invention will become apparent to those skilled in the art upon reading and understanding the following detailed description with reference to the accompanying figures.

DESCRIPTION OF THE PREFERRED EMBODIMENTS

EXAMPLE 1

Hereinafter, a first example of the present invention will be described.

Figure 1:
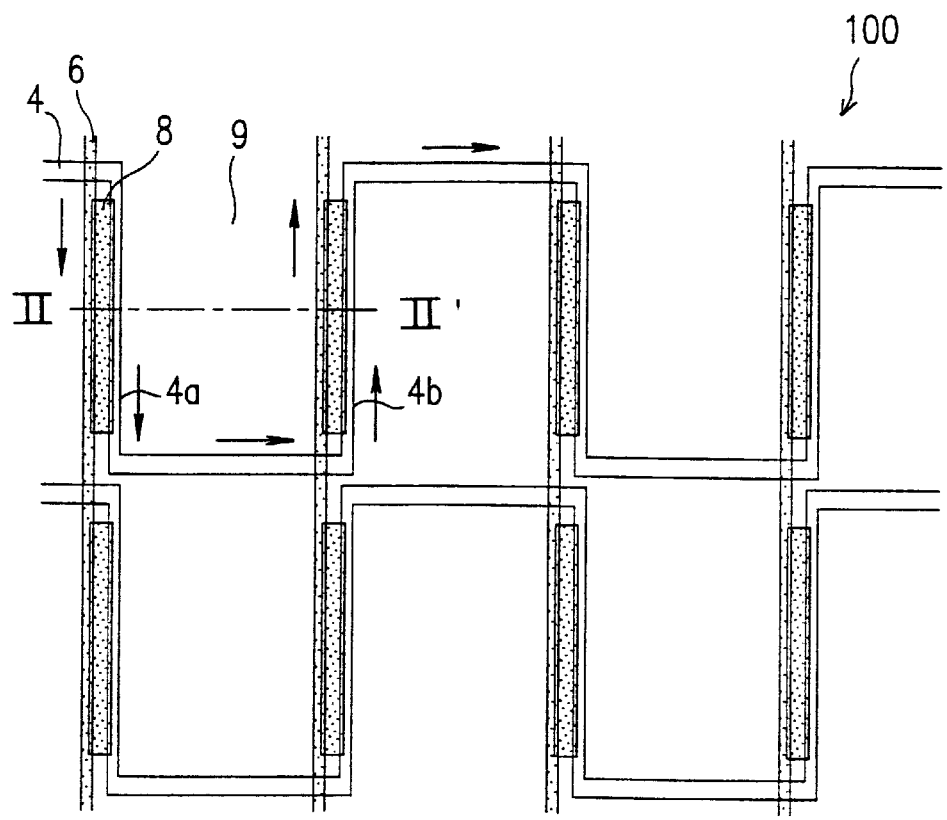
FIG. 1 is a plan view illustrating a LC display device according to Example 1 of the present invention (where a counter substrate is omitted).
Figure 2:
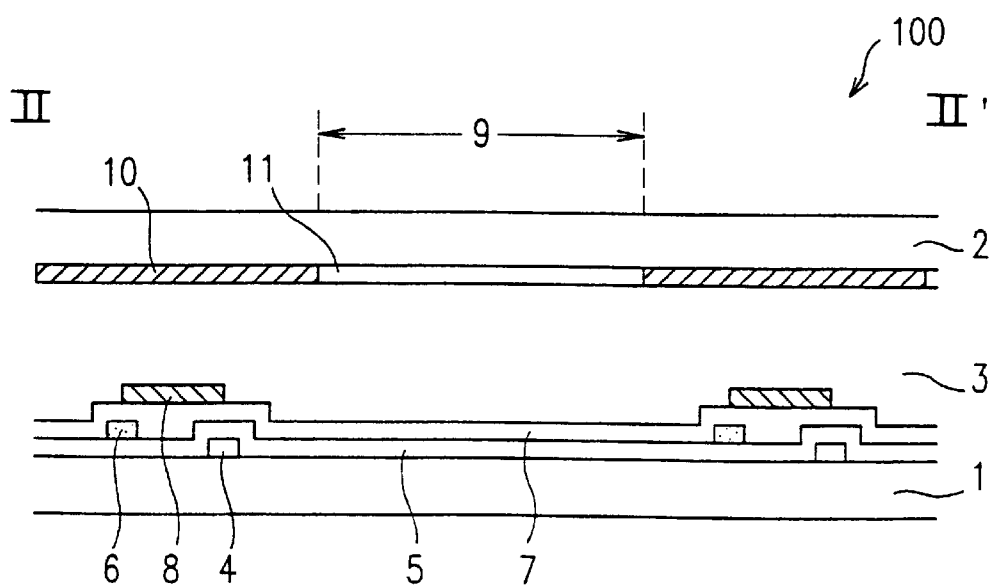
FIG. 2 is a cross-sectional view taken at line II–II' in FIG. 1.

FIG. 1 is a plan view illustrating a LC display device 100 according to Example 1 of the present invention, where a counter substrate is omitted. FIG. 2 is a cross-sectional view taken at line II–II' in FIG. 1.

This LC display device 100 includes a LC layer 3 interposed between a matrix substrate 1 and a counter substrate 2, each substrate 1, 2 being composed of a light-transmitting substrate (e.g., glass).

The structure of the LC display device 100 will be specifically described with reference to its manufacturing process. On the matrix substrate 1, a layer of Al is formed to a thickness of about 2000 angstroms by sputtering, followed by etching with a resist pattern using a proximity large-scale exposure technique, thereby forming row signal lines 4 having a line width of 30 $\mu$m. Thereafter, a first insulative layer 5 of $Ta_2O_5$ is formed to a thickness of about 2500 angstroms by sputtering.

Another layer of Al is formed to a thickness of about 2000 angstroms by sputtering, followed by etching with a resist pattern using a proximity large-scale exposure technique, thereby forming column signal lines 6 having a line width of 30 $\mu$m. Thereafter, a second insulative layer 7 of $Ta_2O_5$ is formed to a thickness of about 2500 angstroms by sputtering.

Subsequently, a layer of a Ni—Fe—Co type material, Ne—Fe type material, Fe—Si type material, or the like is formed to a thickness of about 3000 angstroms by sputtering, followed by etching with a resist pattern using a proximity large-scale exposure technique, thereby forming the magnetic memory elements 8 (line width: 50 $\mu$m; length 300 $\mu$m). Thus, the matrix substrate 1 is completed.

On the counter substrate 2, a light-shielding film 10 having apertures corresponding to respective pixels 9 surrounded by the row signal lines 4 and the column signal lines 6 on the matrix substrate 1 is formed. A color filter 11 is formed in the apertures.

Next, a polyimide alignment film (not shown) is printed on the respective surfaces of the matrix substrate 1 and the counter substrate 2, and subjected to a rubbing treatment. Thereafter, spherical spacers (not shown) are dispersed so as to retain an interspace between the matrix substrate 1 and the counter substrate 2. Thereafter, the substrates 1 and 2 are attached to each other, and sealed after injecting a LC material having a positive anisotropy of magnetic susceptibility therebetween, whereby the LC layer 3 is obtained. Thus, the LC display device 100 according to the present example is completed.

As shown in FIG. 1, in the LC display device 100 having the above-described structure, the row signal lines 4 have a bent pattern so as to extend partially in parallel to the column signal lines 6. The magnetic memory elements 8 are formed along the portions of the row signal lines 4 which extend in parallel to the column signal lines 6. Each region surrounded by two row signal lines 4 and two column signal lines 6 defines a pixel 9.

Next, a method of writing to the magnetic memory element 8 according to Example 1 of the present invention is described with reference to FIG. 3.

Figure 3:
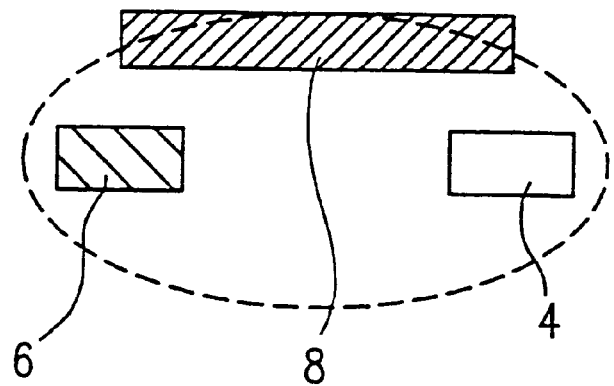
FIG. 3 is a cross-sectional view schematically showing a magnetic field in the vicinity of a magnetic memory element according to Example 1 of the present invention.

When a current is allowed to flow in the same direction through a row signal line 4 and a column signal line 6, a magnetic field having a cross section as shown in FIG. 3 is formed along the corresponding magnetic memory element 8. If a magnetic field of an intensity exceeding the coercive force of the magnetic memory element 8 is applied in this state, remanent magnetization emerges in the magnetic memory element 8 in a direction running parallel to the substrate surface. The direction of magnetization can be switched in accordance with the direction in which the current flows.

Under the above principle, the currents to be allowed to flow in the row signal line 4 and the column signal line 6 are prescribed in such a manner that the magnetization direction of the magnetic memory element 8 is switched only by a combination of the magnetic field generated by the row signal line 4 and the column signal line 6.

Specifically, a current will flow in opposite directions through a portion 4a (hereinafter "descending portion") and through a portion 4b (hereinafter "ascending portion") of the row signal line 4 having a bent pattern as shown in FIG. 1 (see the arrows). Accordingly, in the case where a current flows through the row signal line 4 from the left to the right in FIG. 1, a downward current (as seen in the figure) is allowed to flow in a column signal line 6 which is adjacent the descending portion 4a, while an upward current (as seen in the figure) is allowed to flow in a column signal line 6 which is adjacent the ascending portion 4b. In the case where the current flows through the row signal line 4 in the opposite direction, currents are allowed to flow in the opposite directions through the aforementioned column signal lines 6. The values of the currents flowing the row signal line 4 and the column signal line 6 are prescribed to be equal.

Based on the above scheme, the magnetization of the magnetic memory element 8 will be changed in the case where currents flow in the same direction through both the row signal line 4 and the column signal line 6. On the other hand, the magnetization of the magnetic memory element 8 will not be changed by a magnetic field generated by a current flowing through the row signal line 4 or the column signal line 6 alone because it does not exceed the coercive force of the magnetic memory element 8.

As will be understood from the above, by allowing currents to flow in the same direction through a pair of signal lines (i.e., a row signal line and a column signal line) corresponding to a magnetic memory element 8 for which writing is to be performed, magnetization directions can be written to a matrix of magnetic memory elements 8 in a point sequential manner. In those magnetic memory elements 8 for which writing is not to be performed, a current is allowed to flow in only one of the pair of signal lines (a row signal line 4 and a column signal line 6) or neither of the two signal lines, so that the magnetization directions previously written in those magnetic memory elements 8 are retained.

Figure 4:
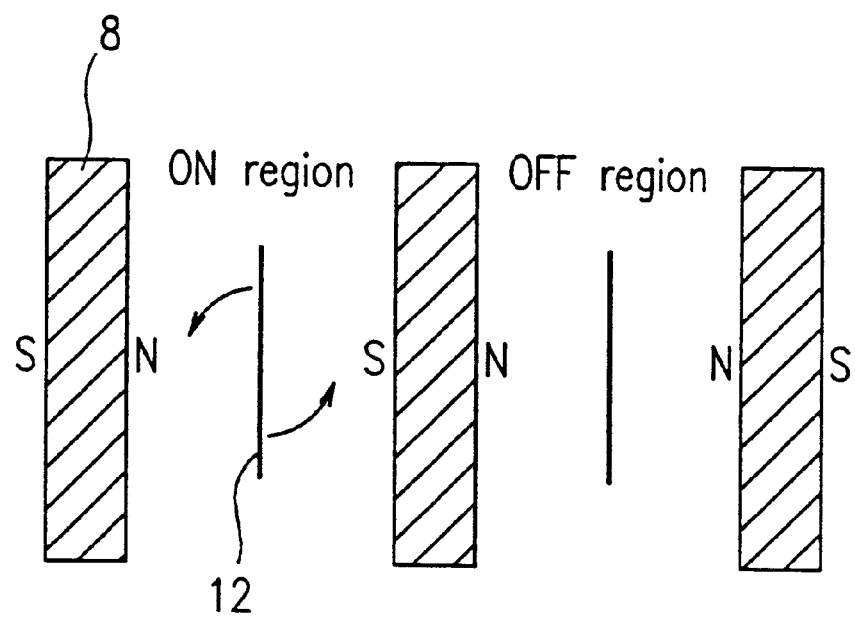
FIG. 4 is a plan view schematically showing the orientation of LC molecules interposed between magnetic memory elements according to Example 1 of the present invention.

Next, the operation principle of the LC layer according to Example 1 of the present invention will be described with reference to FIG. 4.

As described above, a magnetization direction can be written or retained in each magnetic memory element 8, whereby the magnetic field between given magnetic memory elements 8 can be controlled. For example, in an ON region as designated in FIG. 4, a lateral magnetic field is generated because the two adjoining magnetic memory elements 8 retain different polarities. In an OFF region, no lateral magnetic field is generated because the two adjoining magnetic memory elements 8 retain the same polarity.

The orientation 12 of LC molecules is made parallel to the magnetic memory elements 8 in the OFF region based on the rubbing treatment applied to the alignment films (not shown). On the other hand, the aforementioned lateral magnetic field applied to the LC molecules in the ON region results in a LC driving moment which causes the LC molecules to be aligned perpendicular to the longitudinal direction of the magnetic memory element 8. The orientations of the LC molecules in the ON regions are thus changed, thereby achieving optical modulation in accordance with the changes in the orientations 12 of the LC molecules.

The LC display device according to the present example is produced by patterning through a photolithography process based on a proximity large-scale exposure technique. Although this results in somewhat poorer accuracy (e.g., about 10 $\mu$m) than the accuracy (about 1 $\mu$m) of a conventionally-employed high precision photolithography technique utilizing an exposure apparatus including a projection lens system and a stage having a high alignment accuracy, no display malfunctioning was observed in the LC display device of the present invention due to the accuracy problem.

The photolithography apparatus employed in the manufacturing process according to the present invention is inexpensive as compared to that employed in the prior art, and the processing time in the exposition step is multiple times smaller. Since sputtering apparatuses were used for all film formation, the need for a PE-CVD apparatus (which is essential to the formation of TFTs under the prior art) is eliminated, thereby leading to a decrease in the cost of the apparatus and enhancement in processing ability.

EXAMPLE 2

Next, a second example of the present invention will be described.

Figure 5:
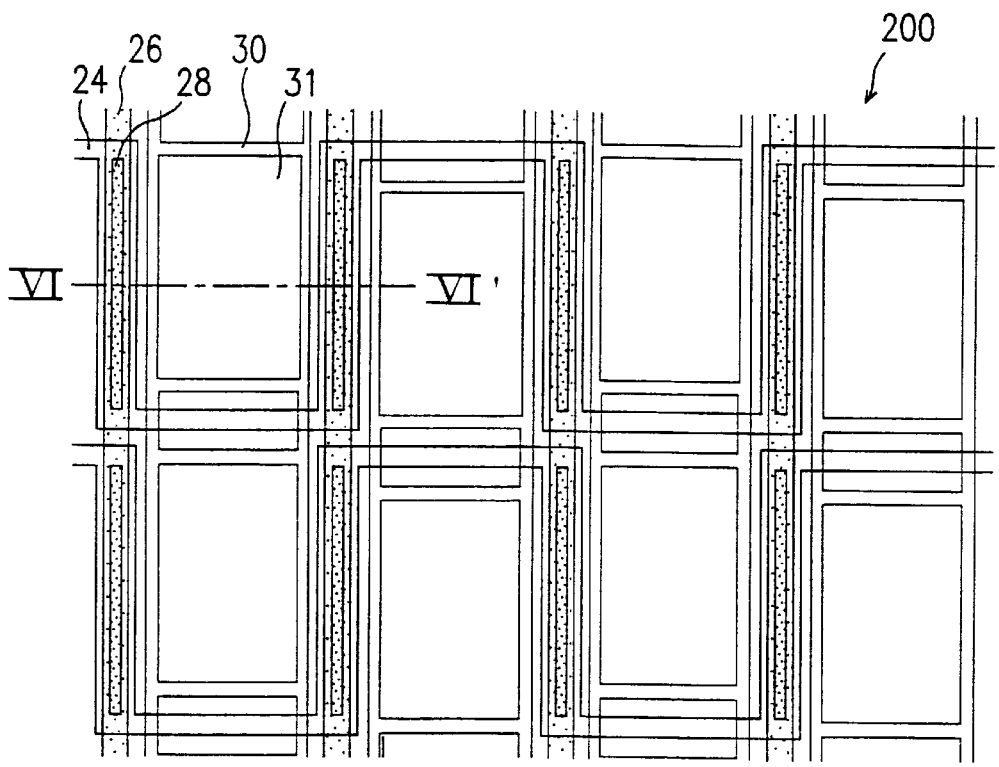
FIG. 5 is a plan view illustrating a LC display device according to Example 2 of the present invention (where a counter substrate is omitted).
Figure 6:
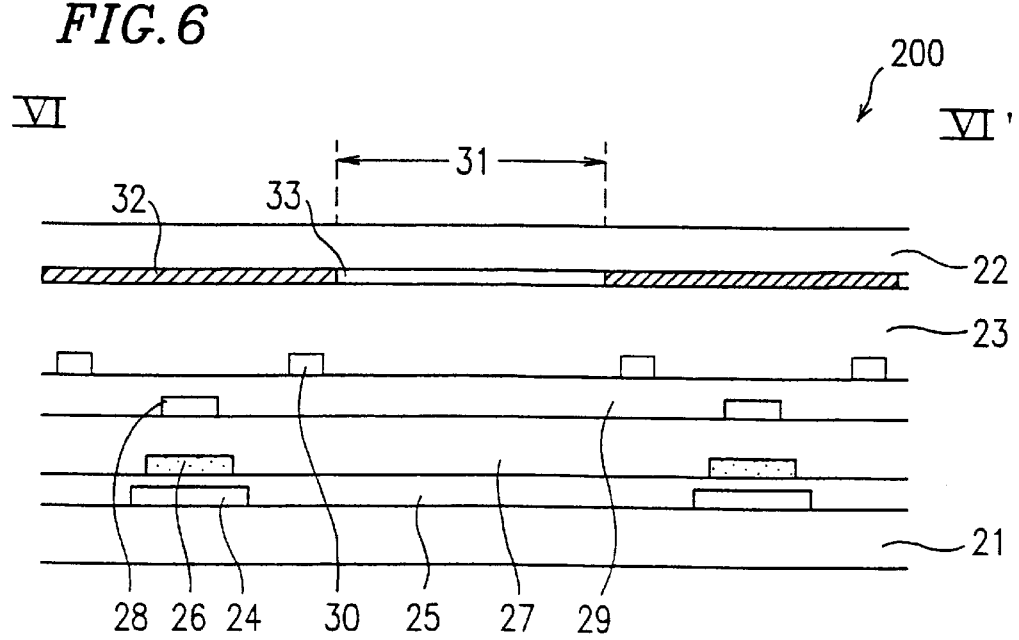
FIG. 6 is a cross-sectional view taken at line VI–VI' in FIG. 5.

FIG. 5 is a plan view illustrating a LC display device 200 according to Example 2 of the present invention, where a counter substrate is omitted. FIG. 6 is a cross-sectional view taken at line VI–VI' in FIG. 5.

This LC display device 200 includes a LC layer 23 interposed between a matrix substrate 21 and a counter substrate 22, each substrate 21, 22 being composed of a light-transmitting substrate (e.g., glass). The structure of the LC display device 200 will be specifically described with reference to its manufacturing process.

On the matrix substrate 21, a conductive paste containing Ag is printed so as to form row signal lines 24 (line width: 150 $\mu$m) to a thickness of about 1 $\mu$m. Thereafter, $SiO_2$ is coated to a thickness of about 1.5 $\mu$m through a dip process using a sol-gel technique, thereby forming a first insulative layer 25. A spin coating, printing, or plating method can be used instead of a dip process.

Next, a conductive paste containing Ag is printed so as to form column signal lines 26 (line width: 130 $\mu$m) to a thickness of about 1 $\mu$m. Thereafter, $SiO_2$ is coated to a thickness of about 3 $\mu$m through a dip process using a sol-gel technique, thereby forming a second insulative layer 27.

Subsequently, a paste containing ferromagnetic particles such as Fe, Fe—Si, $\gamma$-$Fe_2O_3$, or $CrO_2$ is printed to a thickness of about 1 $\mu$m, thereby forming magnetic memory elements 28 (line width: 100 $\mu$m; length 600 $\mu$m). The width of the magnetic memory element 28 is made smaller than that of the row signal lines 24 and the column signal lines 26 so that the magnetic memory elements 28 will receive a magnetic field applied in a direction parallel to the substrate surface. Next, SiO$_2$ is coated to a thickness of about 1.5 μm through a dip process using a sol-gel technique, thereby forming a third insulative layer 29.

Furthermore, a conductive paste containing Ag is printed, and a shield electrode 30 (line width: 100 μm) is formed to a thickness of about 1 μm. Thus, the matrix substrate 21 is completed.

On the counter substrate 22, a light-shielding film 32 having apertures corresponding to respective pixels 31 surrounded by the row signal lines 24 and the column signal lines 26 on the matrix substrate 21 is formed. A color filter 33 is formed in the apertures.

Next, a polyimide alignment film (not shown) is printed on the respective surfaces of the matrix substrate 21 and the counter substrate 22, and subjected to a rubbing treatment. Thereafter, spherical spacers (not shown) are dispersed so as to retain an interspace between the matrix substrate 21 and the counter substrate 22. Thereafter, the substrates 21 and 22 are attached to each other, and sealed after injecting a LC material (e.g., same material as that used in Example 1) therebetween, whereby the LC layer 23 is obtained. Thus, the LC display device 200 according to the present example is completed.

In the LC display device 200 of the above-described structure, the row signal lines 24 have a bent pattern including parallel portions overlapping portions of the column signal lines 26. The magnetic memory elements 28 are formed along the parallel portions of the row signal lines 24 overlapping the column signal lines 26. The shield electrode 30, which is coupled to ground while the display device is being driven,, is formed so as to surround respective pixels 31.

Since the shield electrode 30 prevents electric fields generated by the row signal lines 24 and the column signal lines 26 from affecting the pixels 31, it is possible to control the orientation of the LC molecules with magnetic fields even in the case where a high voltage is applied to the row signal lines 24 and the column signal lines 26 while the apparatus is being driven. Moreover, the orientation of the LC molecules in the LC layer 23 can be controlled with magnetic fields even in the case where there is a high wiring resistance and/or the insulative films has large capacitance. Therefore, the constraints regarding the resistivity and dielectricity of the material of the LC layer 23, film thickness, and/or line width can be greatly reduced.

The method of writing to the magnetic memory element 28 according to Example 2 of the present invention, and the operation principles of the LC layer 23 are the same as those described in Example 1.

In Example 2, the patterning is performed by printing. Although this results in somewhat poorer accuracy (e.g., about several dozen μm) than the accuracy of a conventionally-employed high precision photolithography technique (e.g., 1 μm) utilizing an exposure apparatus including a projection lens system and a stage having a high alignment accuracy, no display malfunctioning was observed in the LC display device of the present invention due to the accuracy problem.

The process of Example 2 eliminates the need for a photolithography process and a vacuum film formation process, thereby leading to a large decrease in the cost of the apparatus as compared to a conventional LC display device.

EXAMPLE 3

Hereinafter, a third example of the present invention will be described.

Figure 7:
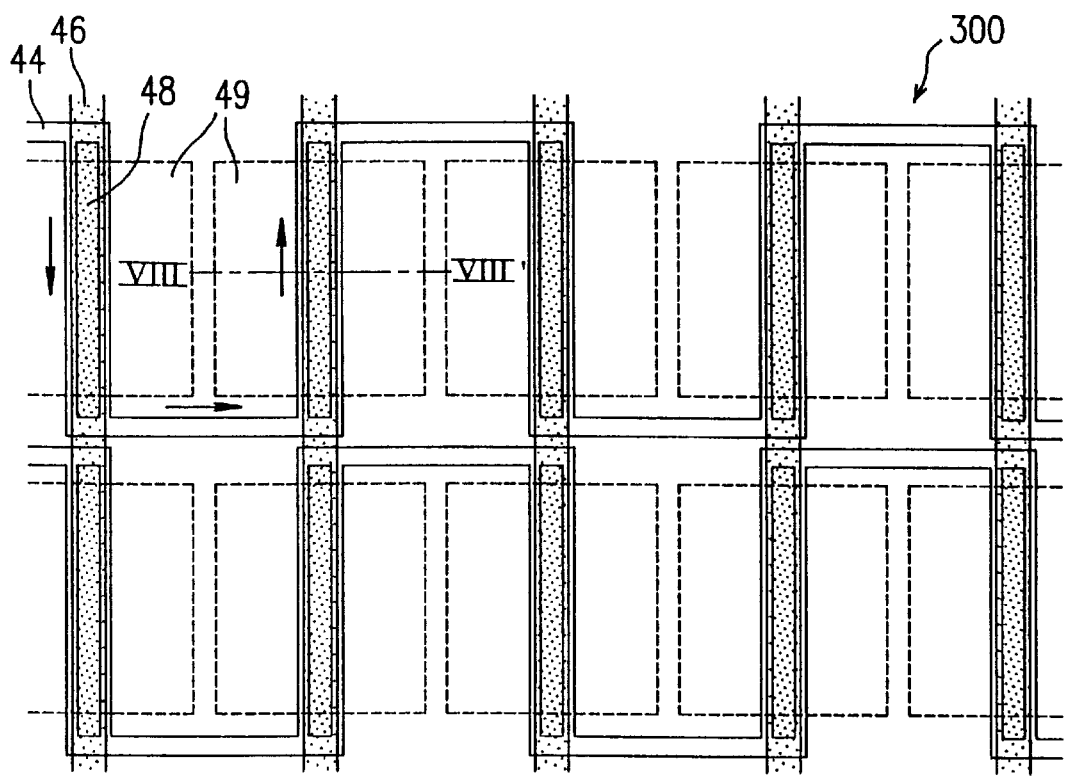
FIG. 7 is a plan view illustrating a LC display device according to Example 3 of the present invention (where a counter substrate is omitted).
Figure 8:
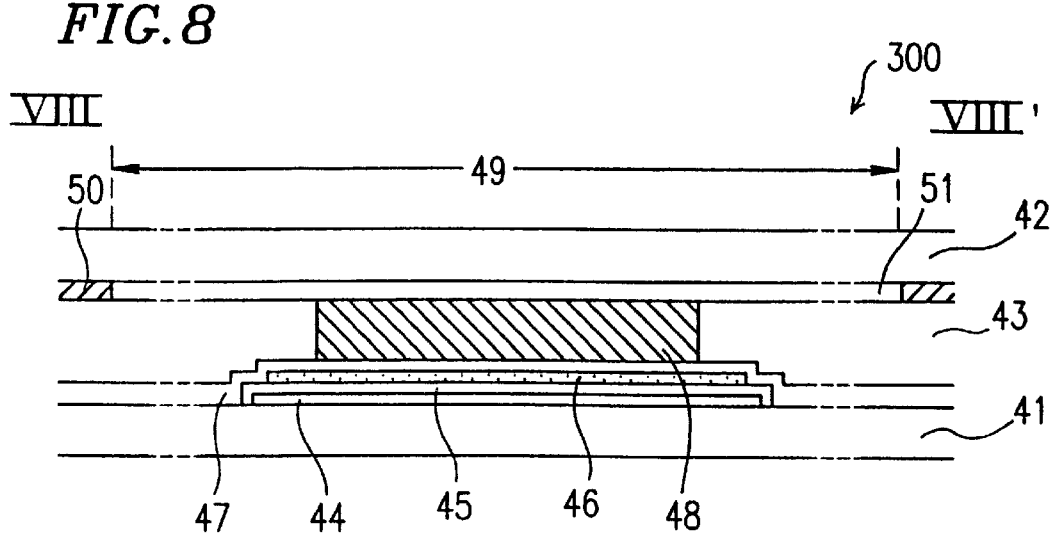
FIG. 8 is a cross-sectional view taken at line VIII–VIII' in FIG. 7.

FIG. 7 is a plan view illustrating a LC display device 300 according to Example 3 of the present invention, where a counter substrate is omitted. FIG. 8 is a cross-sectional view taken at line VIII–VIII' in FIG. 7.

This LC display device 300 includes a LC layer 43 interposed between a matrix substrate 41 and a counter substrate 42, each substrate 41, 42 being composed of a light-transmitting substrate (e.g., glass). The structure of the LC display device 300 will be specifically described with reference to its manufacturing process.

On the matrix substrate 41, a layer of Al is formed to a thickness of about 3000 angstroms by sputtering, followed by etching with a resist pattern using a proximity large-scale exposure technique, thereby forming row signal lines 44 having a line width of 70 μm. Then, Al$_2$O$_3$ is coated to a thickness of about 1500 angstroms by anodic oxidation, thereby forming a first insulative layer 45.

Another layer of Al is formed to a thickness of about 2000 angstroms by sputtering, followed by etching with a resist pattern using a proximity large-scale exposure technique, thereby forming column signal lines 46 having a line width of 60 μm. Thereafter, a second insulative layer 47 of Ta$_2$O$_5$ is formed to a thickness of about 2500 angstroms by sputtering.

Subsequently, a layer of a Ni—Fe—Co type material or the like is deposited to a thickness of about 3 μm in a magnetic field, followed by etching with a resist pattern using a proximity large-scale exposure technique, thereby forming the magnetic memory elements 48 (line width: 50 μm; length 300 μm). At this step, the magnetic field is applied, in parallel portions of a bent pattern of the row signal lines 44 where they overlap portions of the column signal lines 46, in such a manner that a magnetization easy axis will be formed in a direction which is substantially perpendicular to the row signal lines 44 and the column signal lines 46, (i.e., a direction which is substantially perpendicular to the direction in which a current will flow). Magnetic memory elements 48 having such magnetization easy axes can also be formed by plating, printing, etc. Thus, the matrix substrate 41 is completed.

On the counter substrate 42, a light-shielding film 50 having apertures corresponding to respective pixels 49, where each pixel 49 is centered around a magnetic memory element 48 on the matrix substrate 41. A color filter 51 is formed in the apertures.

Next, a polyimide alignment film (not shown) is printed on the respective surfaces of the matrix substrate 41 and the counter substrate 42, and subjected to a rubbing treatment. Thereafter, the substrates 41 and 42 are attached to each other, and sealed after injecting a LC material (e.g., same material as that used in Example 1) therebetween, whereby the LC layer 43 is obtained. Thus, the LC display device 300 according to the present example is completed.

As shown in FIG. 7, in the LC display device 300 having the above-described structure, the row signal lines 44 have a bent pattern including parallel portions overlapping portions of the column signal lines 46. The magnetic memory elements 48 are formed along the parallel portions (i.e., overlapping portions) of the row signal lines 44 overlapping the column signal lines 46. Each pixel 49 is formed around and within the range of the magnetic field of a corresponding magnetic memory element 48.

Figure 9:
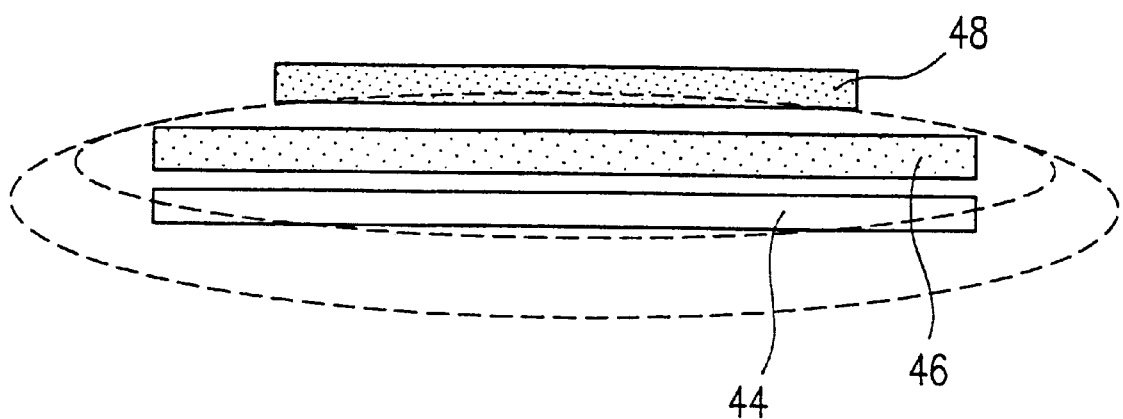
FIG. 9 is a plan view schematically showing a magnetic field in the vicinity of a memory element according to Example 3 of the present invention.

Next, a method of writing to the magnetic memory element 48 according to Example 3 of the present invention is described with reference to FIG. 9.

When a current is allowed to flow through a row signal line 44 and a column signal line 46, a magnetic field (shown by the broken lines in FIG. 9) extending in a horizontal direction is formed around each signal line 44, 46 at the corresponding magnetic memory element 48. The intensity of the magnetic field around the magnetic memory element 48 is a sum of the magnetic field generated by the current through the row signal line 44 and the magnetic field generated by the current through the column signal line 46. Thus, the magnetization of the magnetic memory element 48 can be controlled based on a combination of the values of the currents through the row signal line 44 and the column signal line 46.

Figure 10:
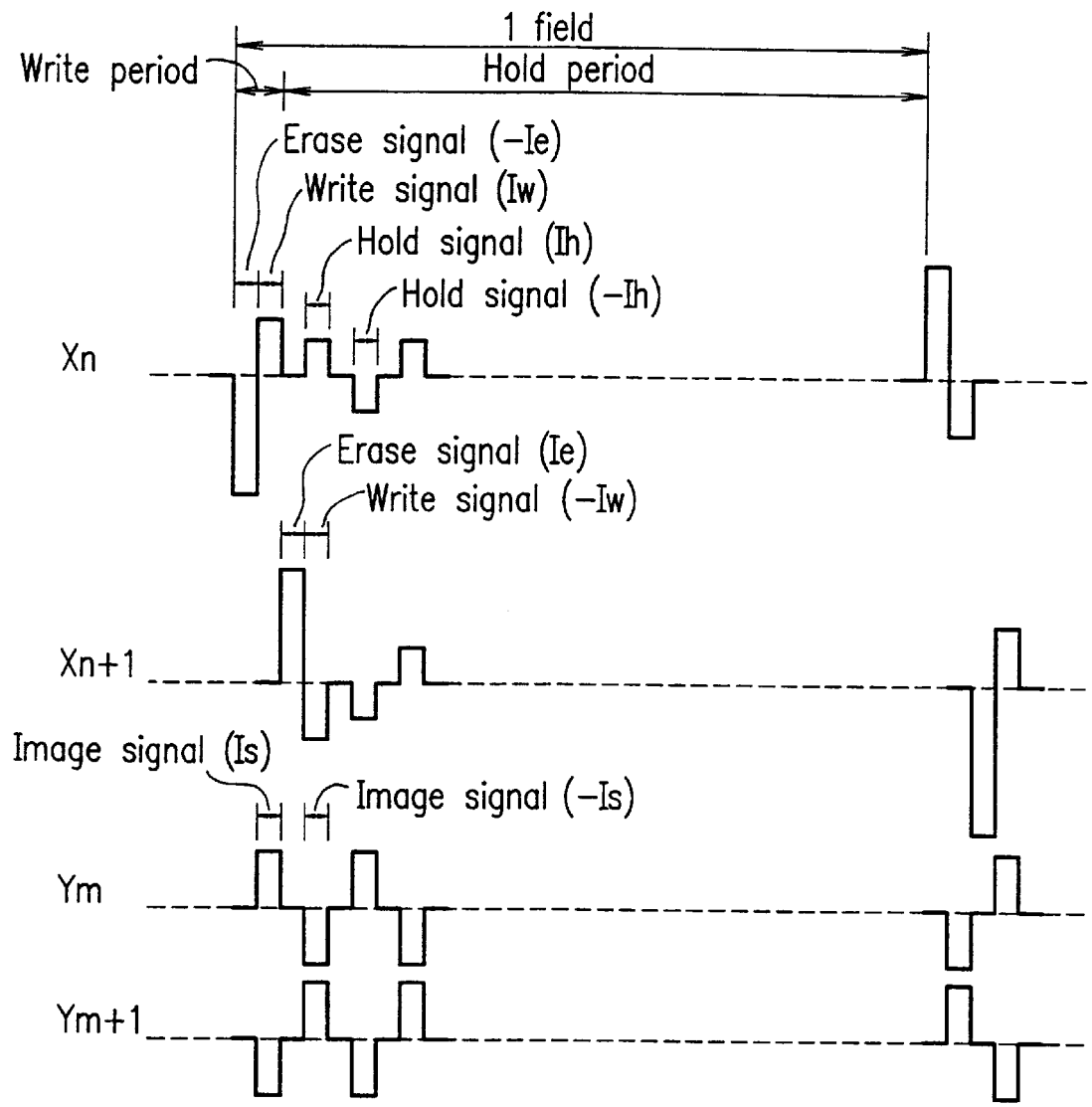
FIG. 10 is a timing diagram illustrating various current values of row and column signal lines in a method for driving a LC display device according to Example 3 of the present invention.

Next, a method for controlling the magnetization of the magnetic memory element 48 according to Example 3 of the present invention will be described with reference to FIG. 10. FIG. 10 is a timing diagram illustrating the current values Xn, Xn+1, . . . of the signals on the row signal lines 44 and the current values Ym, Ym+1, . . . of the signals in the column signal lines 46. In FIG. 10, Xn represents the signal on an $n^{th}$ signal line 44, for example.

In Example 3, line sequential driving is performed. Specifically, line scanning with scanning signals is performed in a line-by-line manner (where every "line" is defined as a row). Scanning signals are sequentially input to the respective row signal lines 44 during a write period so that all rows will be scanned during "1 field" period. The scanning signals include an erase signal Ie or –Ie and write signals Iw and –Iw. During a hold period, i.e., a period other than the write period, a hold signal Ih or –Ih is input.

On the other hand, an image signal Is or –Is corresponding to each pixel along the row for which writing is being performed (i.e., during a write period) is input to a column signal line in synchronization with a write signal.

Each signal is driven by inverting the direction of the current through the row signal lines 44 per each write period and per each field. Furthermore, according to the present example, the direction of the current through the column signal lines 46 is also inverted per each column because of the bent shape of the row signal lines 44 causing the direction of the current through the column signal lines 46 to alternate per each column. However, the scanning method is not limited to the above; for example, an interlacing method can be adopted. In such a case, it is not necessary to perform line scanning for scanning each consecutive line. Also, it is not necessary to invert the direction of the current per each line; however, it is advantageous to do so because, especially by employing a high inversion frequency, the influence due to the asymmetrical characteristics of the magnetic memory elements becomes less likely to be perceived by a user, thereby resulting in improved display quality.

Figure 11:
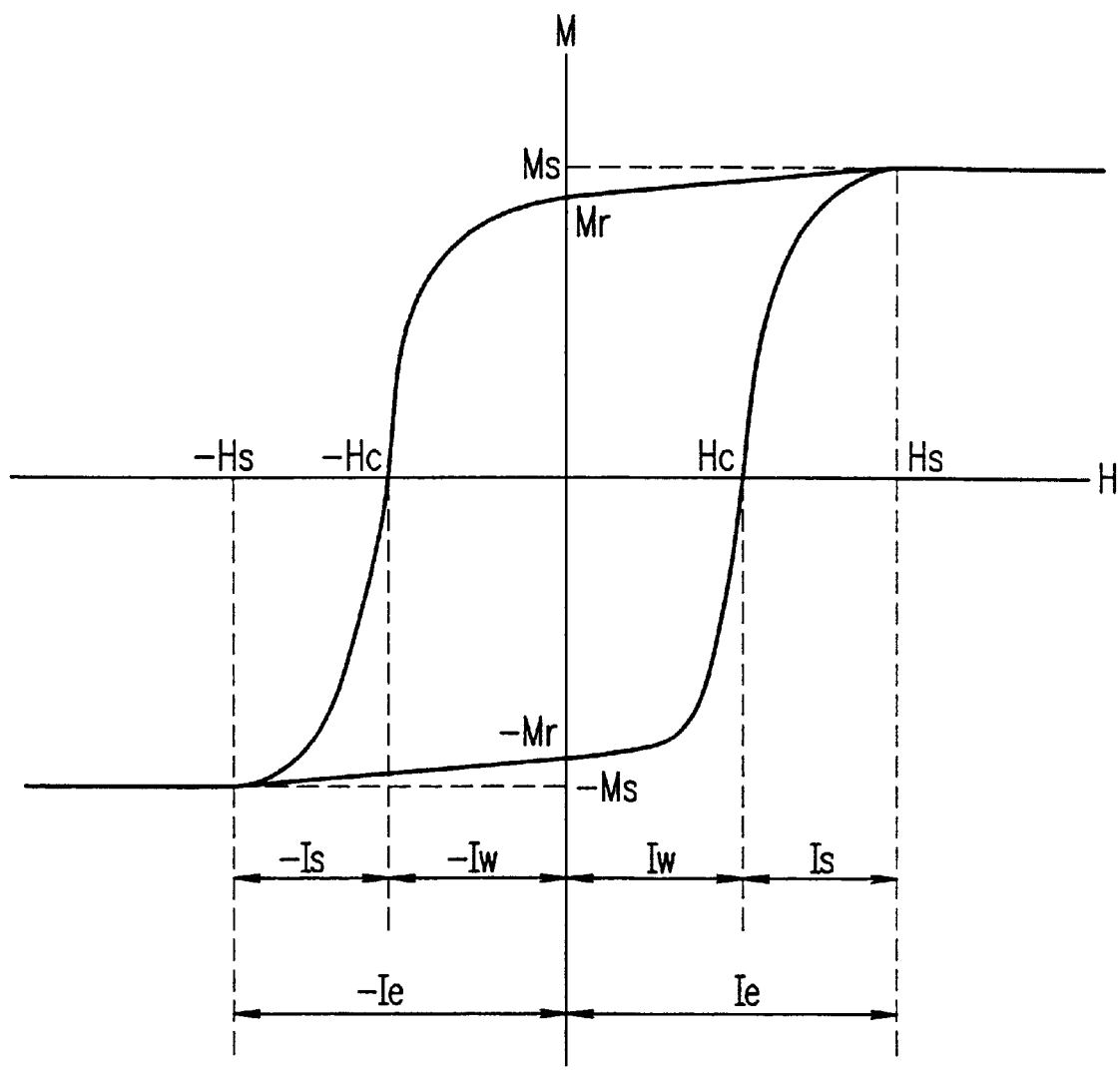
FIG. 11 is a graph illustrating the magnetization of a magnetic memory element according to Example 3 of the present invention.

Next, the magnetization of the magnetic memory element 48 while the display device is being driven will be described, with reference to FIG. 11. FIG. 11 illustrates the relationship of magnetic fields and magnetization corresponding to the current values of various signals based on the hysteresis characteristics of the magnetic memory element 48, First, a write operation to take place during a write period will be described.

An erase signal Ie or –Ie (FIG. 10), which is input to the row signal lines as a scanning signal during a write period, is prescribed at a current value for generating a saturation magnetic field Hs or –Hs, respectively, for the magnetic memory element 48. A write signal, Iw or –Iw, is prescribed at a current value for generating a coercive force Hc or –Hc, respectively, for the magnetic memory element 48.

On the other hand, an image signal Is or –Is, which is input to the column signal lines corresponding to each pixel, is input in synchronization with a write signal Iw or –Iw for the row signal line. The image signal Is or –Is is prescribed at a current value for generating a magnetic field H (where $Hc \leq H \leq Hs$ or $-Hs \leq H \leq -Hc$) respectively, for the magnetic memory element 48 when the image signal is superimposed on the write signal.

By thus controlling the various signals, the magnetization of the magnetic memory element 48 can be written at a desired value M (where $0 \leq M \leq Ms$ or $-Ms \leq M \leq 0$) in accordance with the hysteresis characteristics of the magnetic memory element 48, thereby enabling gray scale display.

Next, a hold operation to take place during a hold period will be described.

In order to prevent the magnetization which was written during a write period from lowering during a hold period, a hold signal Ih or –Ih is input to the row signal line as a current in the opposite direction for substantially minimizing change in the magnetization by cancelling the magnetic field generated by the image signal Is or –Is input to the row signal lines.

The hold signal Ih or –Ih is prescribed at such a current value that the magnetic field generated when superimposed on the magnetic field generated by the maximum value of the absolute value of the image signal (Is or –Is) does not exceed the coercive force of the magnetic memory element. Furthermore, in the present example, special attention is paid to the stabilization of magnetization by prescribing the hold signal Ih or –Ih at such a current value that the magnetic field applied to the magnetic memory element is not in the opposite direction of the magnetization of the magnetic memory element.

Furthermore, in order to prevent the magnetization which was written during a write period from fluctuating during a hold period, it is desirable that the square feature (=remnant magnetization Mr/saturation magnetization Ms) be close to 1.

In order to bring the square feature of the magnetic memory element into proximity of 1, it is effective to provide the magnetic memory element 48 with uniaxial magnetic anisotropy by forming a magnetization easy axis along a direction perpendicular to the relevant signal line (i.e., magnetization direction), that is, along a direction perpendicular to the flow of current.

Methods for obtaining uniaxial magnetic anisotropy include, for example, subjecting a Ni—Fe alloy (e.g., 80% Ni-20% Fe), a Ni—Fe alloy containing additional elements, or the like to a cooling or heating treatment in a magnetic field, vapor deposition in a magnetic field, or electrodeposition. Alternatively, uniaxial magnetic anisotropy can be obtained by applying magnetic powder, e.g., $\gamma$-Fe$_2$O$_3$, Co-coated $\gamma$-Fe$_2$O$_3$, CrO$_2$, or Fe while it is aligned in a magnetic field.

In particular, in order to obtain excellent display characteristics free of crosstalk in gray scale display, it is best to prevent the magnetic field generated by the image signal Is or –Is input to the column signal line during a hold period from affecting the magnetization of the magnetic memory element.

Therefore, in terms of the characteristics of the magnetic memory element, it is desirable to satisfy the relationship|coercive force Hc|>|saturation magnetic field Hs–coercive force Hc|. The reason is that the magnetic field generated by the image signal Is or –Is input to the column signal line is prescribed to be equal to or smaller than|saturation magnetic field Hs–coercive force H|according to the present example; therefore, the relationship|coercive force Hc|>|saturation magnetic field Hs–coercive force Hc|provides that the magnetic field generated by the image signal does not exceed the coercive force of the magnetic memory element. However, prescribing the coercive at a high value results in an increase in the current required for driving the display device and hence an increase in the power consumption. Therefore, it is also effective to reduce the saturation magnetic field to the above end.

By applying such considerations, the magnetization of the magnetic memory element can be retained during a hold period, so that display characteristics free of crosstalk can be obtained.

Figure 12:
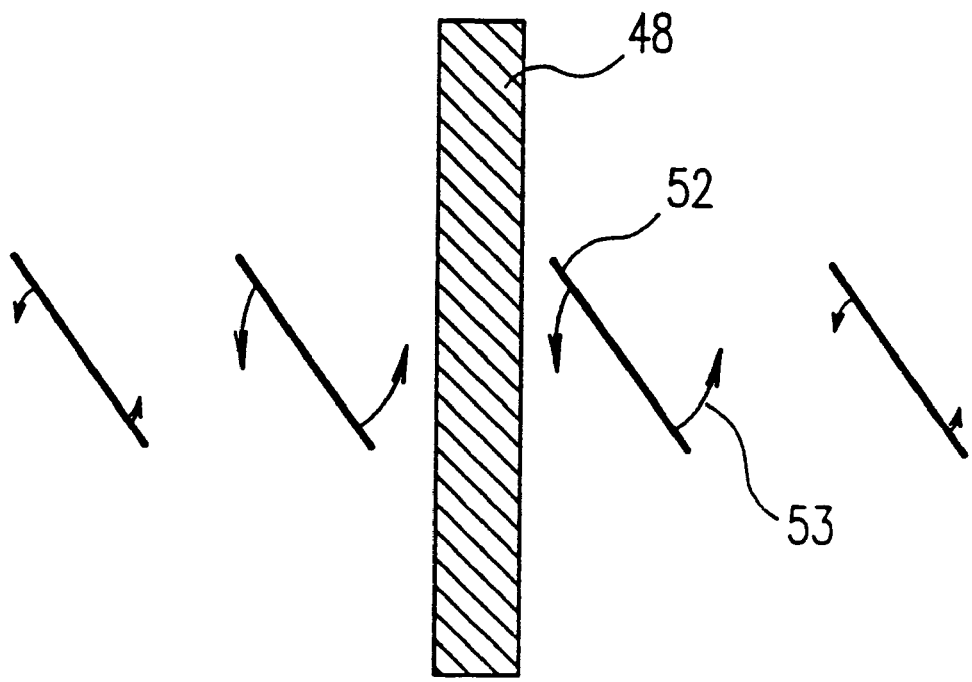
FIG. 12 is a plan view schematically showing the orientation of LC molecules in the vicinity of a memory element according to Example 3 of the present invention.

Next, the operation principles of the LC layer according to Example 3 will be described with reference to FIG. 12.

As described above, any desired state of magnetization can be written and retained in the magnetic memory element 48. As a result, the intensity of the magnetic field in the pixel 49 around each magnetic memory element 48 can be controlled. The magnetic field generated in each pixel 49 has an intensity distribution centered around the magnetic memory element 48 such that the magnetic field reduces as the distance from the magnetic memory element 48 increases.

The initial orientation 52 of the LC molecules is prescribed to be at 45° with respect to the longitudinal sides of the magnetic memory element 48. As the intensity of magnetization of the magnetic memory element 48 increases, a moment for driving the LC molecules is created in a direction 53 perpendicular to the longitudinal sides of the magnetic memory element 48 in the case of using a LC material having positive magnetic susceptibility; and a moment for driving the LC molecules is created in a parallel direction to the longitudinal sides of the magnetic memory element 48 in the case of using a LC material having negative magnetic susceptibility.

In either case, the LC molecules in a region which lies close to the magnetic memory element 48 and exposed to an intense magnetic field receive a strong driving moment. This may result in a certain intra-pixel distribution of optical modulation. However, the luminance of each pixel is perceived based on the total amount of light transmitted through the pixel. Therefore, image display including gray scale display can be accomplished.

In Example 3, the patterning is performed by a photolithography process based on a proximity large-scale exposure technique. Although this results in somewhat poorer accuracy (e.g., about 10 $\mu$m) than the accuracy (e.g., about 1 $\mu$m) of a conventionally-employed high precision photolithography technique utilizing an exposure apparatus including a projection lens system and a stage having a high alignment accuracy, no display malfunctioning was observed in the LC display device of the present invention due to the accuracy problem.

The photolithography apparatus employed in the manufacturing process according to the present invention is inexpensive as compared to that employed in the prior art, and the processing time in the exposition step is multiple times smaller. Since sputtering or vapor deposition was used for all film formation apparatuses, the need for a PE-CVD apparatus (which is essential to the formation of TFTs under the prior art) is eliminated, thereby leading to a decrease in the cost of the apparatus and enhancement in processing ability.

Since line sequential scan driving is performed in the present example, the driving frequencies for the signals can be greatly reduced as compared to those required for point sequential scan driving, thereby making it possible to increase the delay margin for the signal lines of the LC display device. As a result, signal materials having relatively large resistance can be appropriately selected for the particular process, thereby making it possible to reduce the processing time owing to reduced film thicknesses of the wiring. Accordingly, the present example can easily accommodate high definition schemes, directed to larger size displays and a larger number of pixels, so that a LC display device with low costs and high performance can be easily realized.

According to the present example, the magnetization of the magnetic memory elements can be controlled to any value between 0 and the saturation magnetization Ms. Therefore, image display including gray scale display can be accomplished with good controllability.

In the general manufacturing of a LC display device, spherical spacers are dispersed upon the matrix substrate and the counter substrate to designate a thickness of the LC layer, before the substrates are attached to each other. However, according to the present example, the magnetic memory elements 48 are also utilized as spacers so that the LC layer 43 has the substantially same thickness as that of the magnetic memory elements 48. Therefore, the distribution of magnetic field intensity along the thickness direction of the LC layer will have uniform horizontal components for the matrix substrate 41 and the counter substrate 42. Since the step for dispersing spherical spacers is thus eliminated, the manufacturing cost can be further reduced.

EXAMPLE 4

Hereinafter, a fourth example of the present invention will be described.

Figure 13:
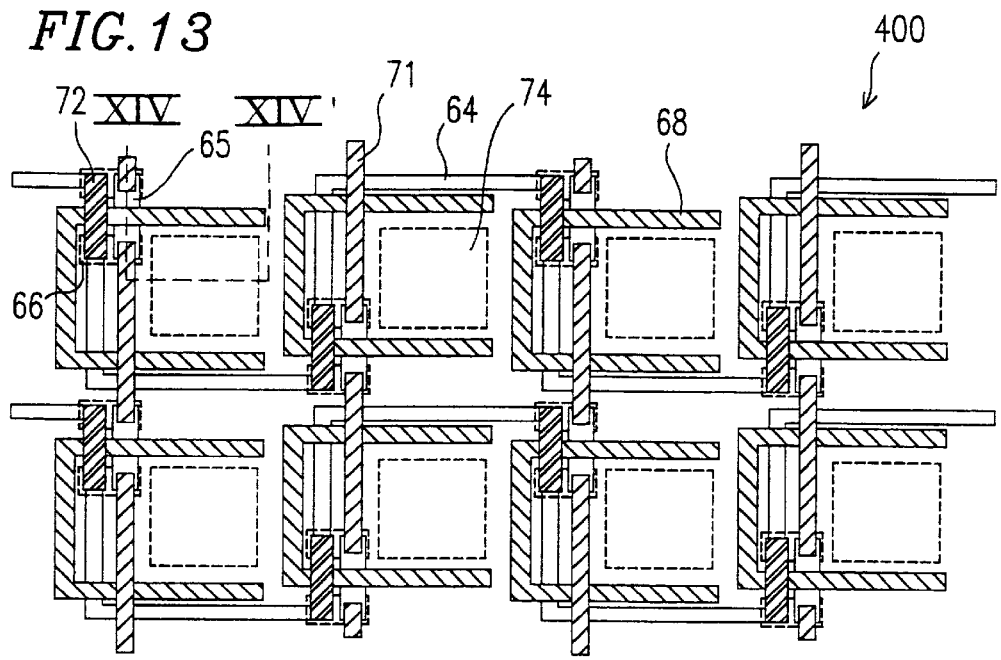
FIG. 13 is a plan view illustrating a LC display device according to Example 4 of the present invention (where a counter substrate is omitted).
Figure 14:
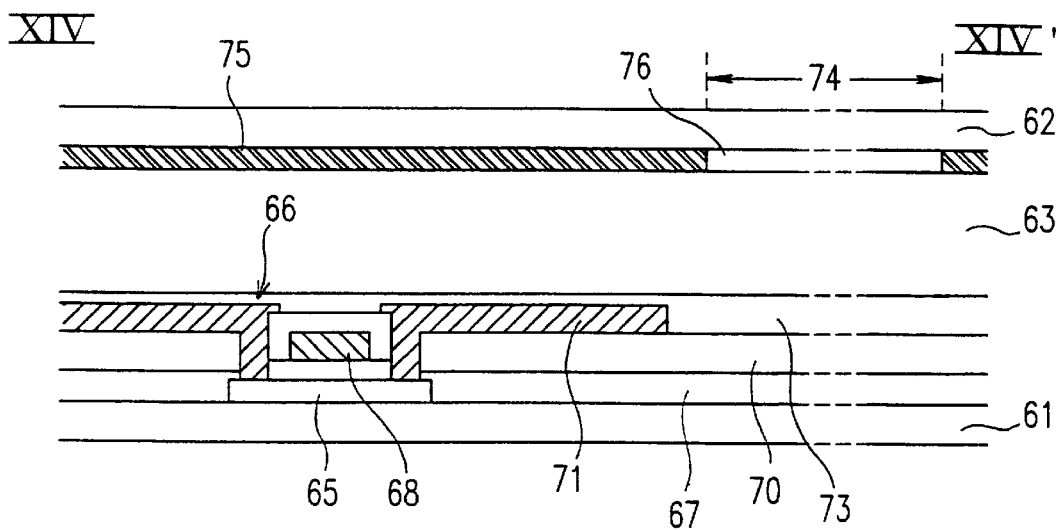
FIG. 14 is a cross-sectional view taken at line XIV–XIV' in FIG. 13.

FIG. 13 is a plan view illustrating a LC display device 400 according to Example 4 of the present invention, where a counter substrate is omitted. FIG. 14 is a cross-sectional view taken at line XIV–XIV' in FIG. 13.

This LC display device 400 includes a LC layer 63 interposed between a matrix substrate 61 and a counter substrate 62, each substrate 61, 62 being composed of a light-transmitting substrate (e.g., glass). The structure of the LC display device 400 will be specifically described with reference to its manufacturing process.

On the matrix substrate 61, a layer of Al is formed to a thickness of about 2000 angstroms by sputtering, followed by etching with a resist pattern using a proximity large-scale exposure technique, thereby forming row signal lines 64 (having a line width of 20 $\mu$m) and portions 65 of column signal lines (having a line width of 30 $\mu$m). Then, $Ta_2O_5$ is formed to a thickness of about 2500 angstroms by sputtering, followed by etching with a resist pattern using a proximity large-scale exposure technique, thereby forming a first insulative layer 67 with contact holes 66 therethrough.

Next, a layer of a Ni—Fe—Co type material or the like is deposited to a thickness of about 3000 angstroms by sputtering or vapor deposition, followed by etching with a resist pattern using a proximity large-scale exposure technique, thereby forming the magnetic memory elements 68 (line width: 30 $\mu$m; length 1000 $\mu$m). Then, $Ta_2O_5$ is formed to a thickness of about 2500 angstroms by sputtering, followed by etching with a resist pattern using a proximity large-scale exposure technique, thereby forming a second insulative layer 70 with contact holes 66 therethrough.

Another layer of Al is formed to a thickness of about 2000 angstroms by sputtering, followed by etching with a resist pattern using a proximity large-scale exposure technique, thereby forming column signal lines 71 (having a line width of 20 μm) and portions 72 of row signal lines. Thereafter, a third insulative layer 73 of $Ta_2O_5$ is formed to a thickness of about 2500 angstroms by sputtering. Thus, the matrix substrate 61 is completed.

On the counter substrate 62, a light-shielding film 75 having apertures corresponding to respective pixels 74, where each pixel 74 is defined as a region surrounded by a magnetic memory element 68 on the matrix substrate 61. A color filter 76 is formed in the apertures.

Next, a polyimide alignment film (not shown) is printed on the respective surfaces of the matrix substrate 61 and the counter substrate 62, and subjected to a rubbing treatment. Thereafter, spherical spacers (not shown) are dispersed so as to retain an interspace between the matrix substrate 61 and the counter substrate 62. Thereafter, the substrates 61 and 62 are attached to each other, and sealed after injecting a LC material (e.g., same material as that used in Example 1) therebetween, whereby the LC layer 63 is obtained. Thus, the LC display device 400 according to the present example is completed.

As shown in FIG. 13, in the LC display device 400 having the above-described structure, the row signal lines 64 have a bent pattern including portions which are parallel to the column signal lines 71 such that the parallel portions of the row signal lines 64 intersect the generally U-shaped magnetic memory element 68 in two positions, i.e., so as to overlie or underlie the magnetic memory element 68. As a result, the magnetic fields generated by the row signal line 64 and the column signal line 71 cause magnetization in the same direction, i.e., along the magnetic memory element 68, thereby further increasing the magnetic field intensity. In the present example, each pixel 74 is defined as a region surrounded by the corresponding magnetic memory element 68.

The method of writing to the magnetic memory element 68 according to Example 4 of the present invention is the same as in Example 3, and a desired state of magnetization can be written and retained in the magnetic memory element 68.

Figure 15:
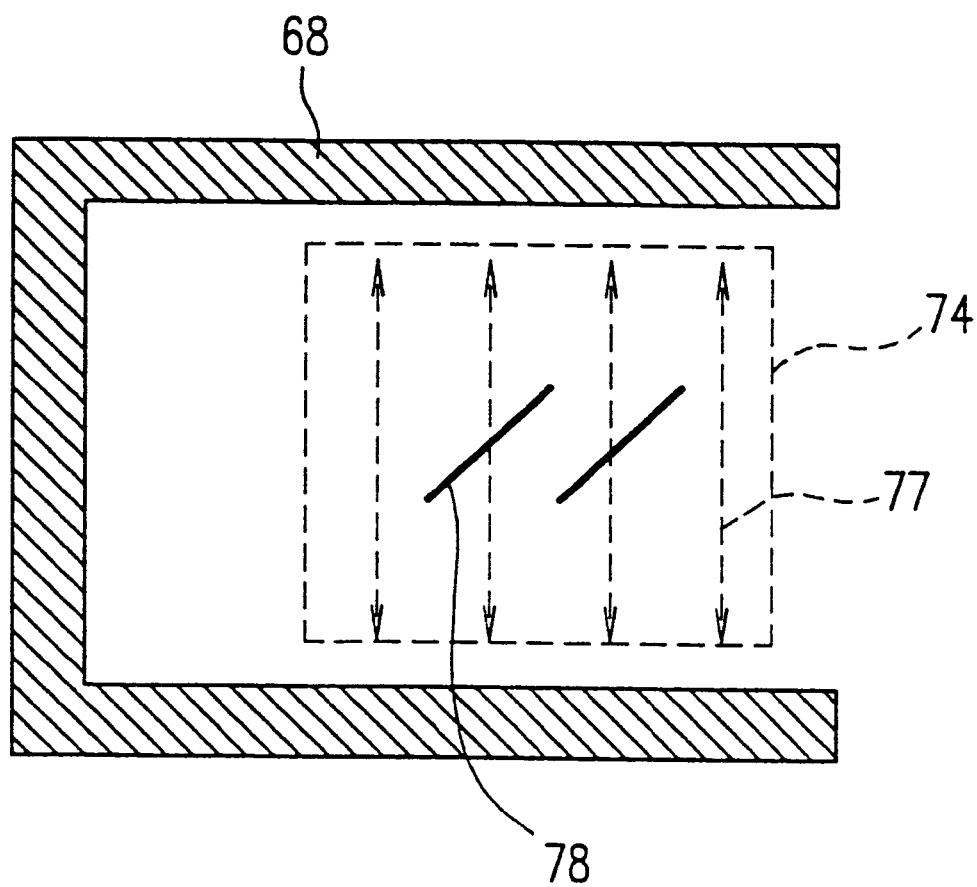
FIG. 15 is a plan view schematically showing the orientation of LC molecules in the vicinity of a memory element according to Example 4 of the present invention.

Next, the operation principles of the LC layer according to Example 4 will be described with reference to FIG. 15.

As described above, a desired state of magnetization can be written and retained in the magnetic memory element 68. As a result, the intensity of the magnetic field in the pixel 74 surrounded by each magnetic memory element 68 can be controlled. Since each magnetic memory element 68 has a general U-shape, the magnetic field orientation 77 generated within each pixel 74 becomes uniform. The shape of the magnetic memory elements 68 can be a general C-shape or an angular C-shape (e.g., "ᒕ") without undermining this effect.

The initial orientation 78 of the LC molecules is prescribed to be at 45° with respect to the magnetic field orientation 77 within each pixel 74. As the intensity of magnetization of the magnetic memory element 68 increases, a moment for driving the LC molecules is created in a direction parallel to the magnetic field orientation 77 in the case of using a LC material having positive magnetic susceptibility; and a moment for driving the LC molecules is created in a perpendicular direction to the magnetic field orientation 77 in the case of using a LC material having negative magnetic susceptibility.

In the case of gray scale display, a certain intra-pixel distribution of optical modulation may result. However, the luminance of each pixel is perceived based on the total amount of light transmitted through the pixel. Therefore, image display including gray scale display can be accomplished. Furthermore, during a "white" or "black" display attained in the absence of a magnetic field or presence of a sufficiently intense magnetic field, the orientation of the LC molecules becomes uniform along the magnetic field orientation 77, so that high-contrasted, excellent display quality is obtained.

In Example 4, the patterning is performed by a photolithography process based on a proximity large-scale exposure technique. Although this results in somewhat poorer accuracy (e.g., about 10 μm) than the accuracy (e.g., about 1 μm) of a conventionally-employed high precision photolithography technique utilizing an exposure apparatus including a projection lens system and a stage having a high alignment accuracy, no display malfunctioning was observed in the LC display device of the present invention due to the accuracy problem.

The photolithography apparatus employed in the manufacturing process according to the present invention is inexpensive as compared to that employed in the prior art, and the processing time in the exposition step is multiple times smaller. Since sputtering or vapor deposition was used for all film formation apparatuses, the need for a PE-CVD apparatus (which is essential to the formation of TFTs under the prior art) is eliminated, thereby leading to a decrease in the cost of the apparatus and enhancement in processing ability.

Since line sequential scan driving is performed in the present example, the driving frequencies for the signals can be greatly reduced as compared to those required for point sequential scan driving, thereby making it possible to increase the delay margin for the signal lines of the LC display device. As a result, signal materials having relatively large resistance can be appropriately selected for the particular process, thereby making it possible to reduce the processing time owing to reduced film thicknesses of the wiring. Accordingly, the present example can easily accommodate high definition schemes, directed to larger size displays and a larger number of pixels, so that a LC display device with low costs and high performance can be easily realized.

According to the present example, the magnetization of the magnetic memory elements can be controlled to any value between 0 and the saturation magnetization Ms. Therefore, image display including gray scale display can be accomplished with good controllability. Since the orientation of the LC molecules can be made uniform, high-contrasted, excellent display quality is obtained.

EXAMPLE 5

Hereinafter, a fifth example of the present invention will be described.

Figure 16:
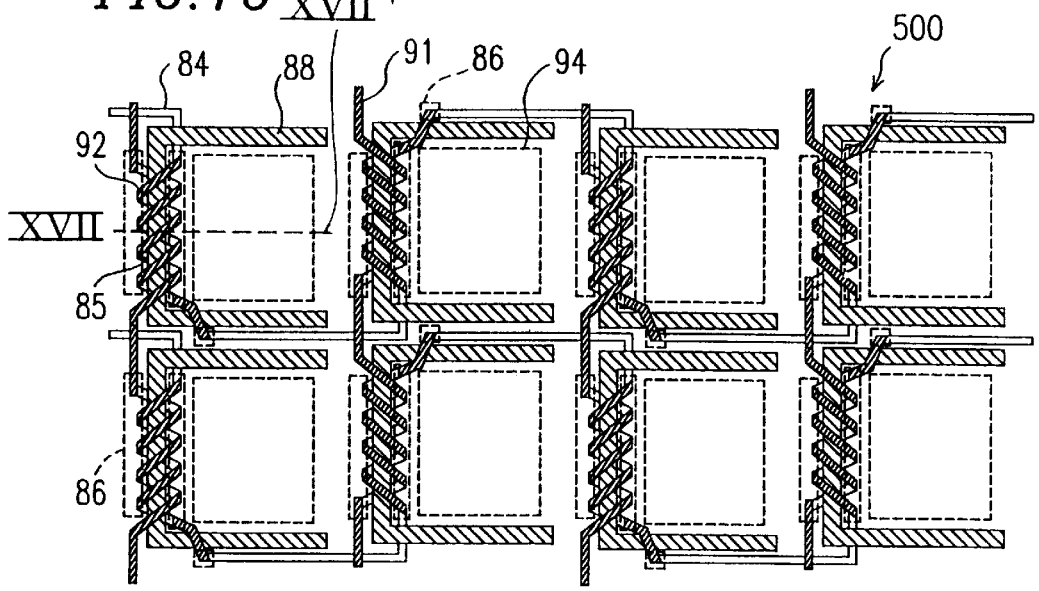
FIG. 16 is a plan view illustrating a LC display device according to Example 5 of the present invention (where a counter substrate is omitted).
Figure 17:
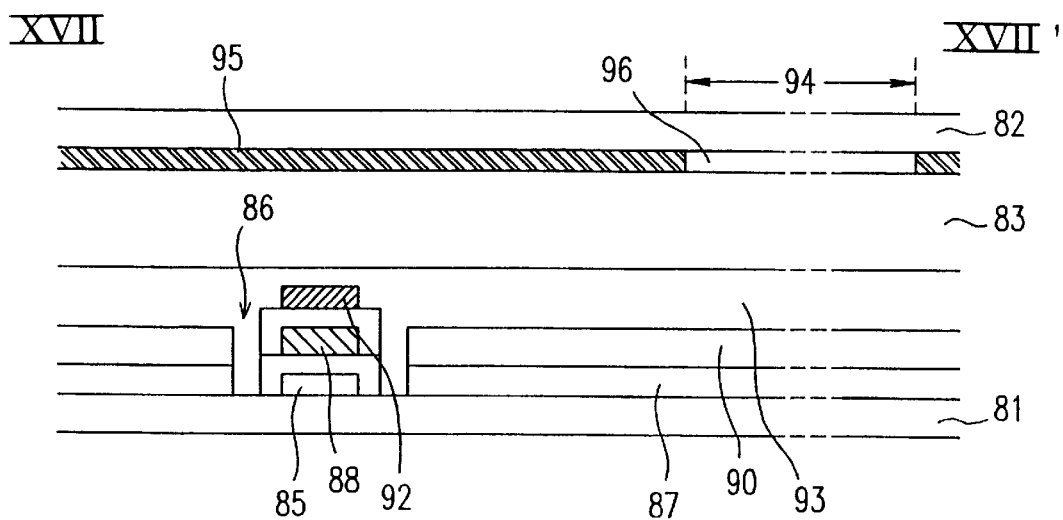
FIG. 17 is a cross-sectional view taken at line XVII–XVII' in FIG. 16.
Figure 18:
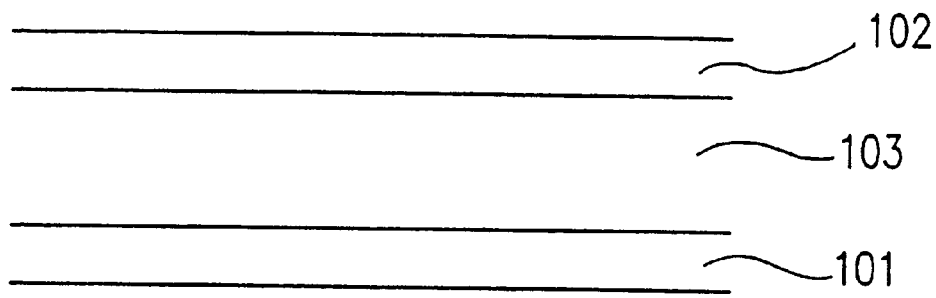
FIG. 18 is a cross-sectional view illustrating a typical conventional LC display device
Figure 19:
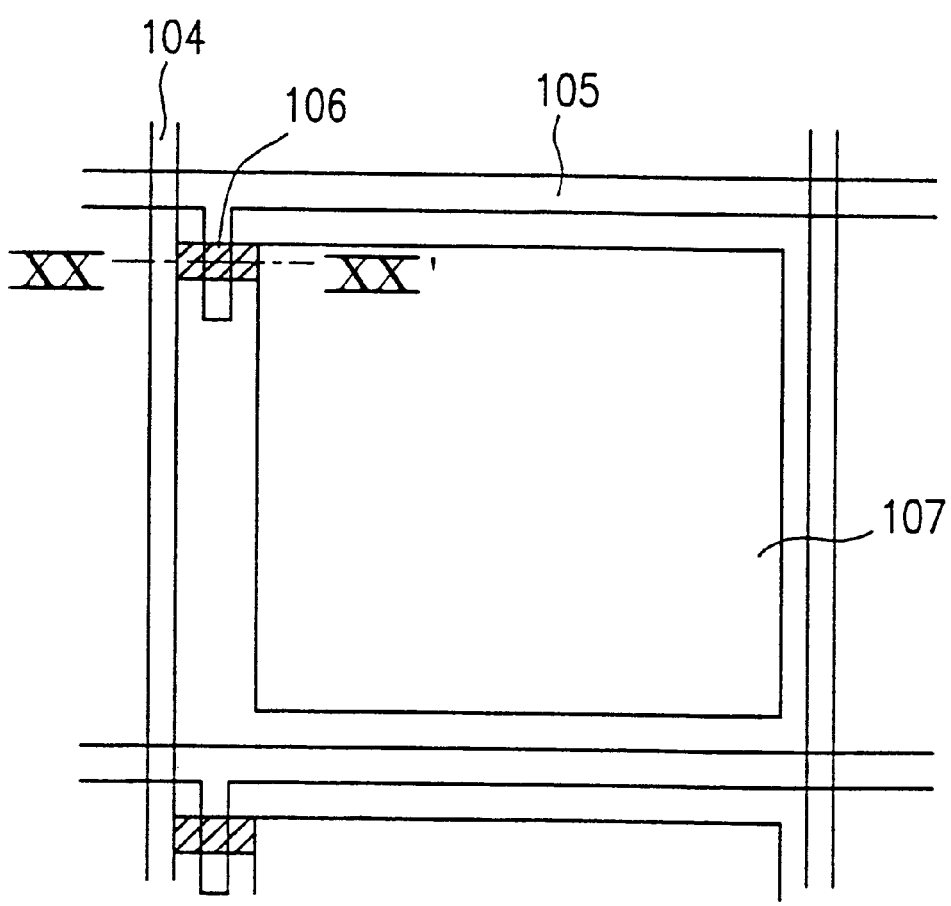
FIG. 19 is a plan view illustrating a matrix substrate for use in a typical conventional LC display device.
Figure 20:
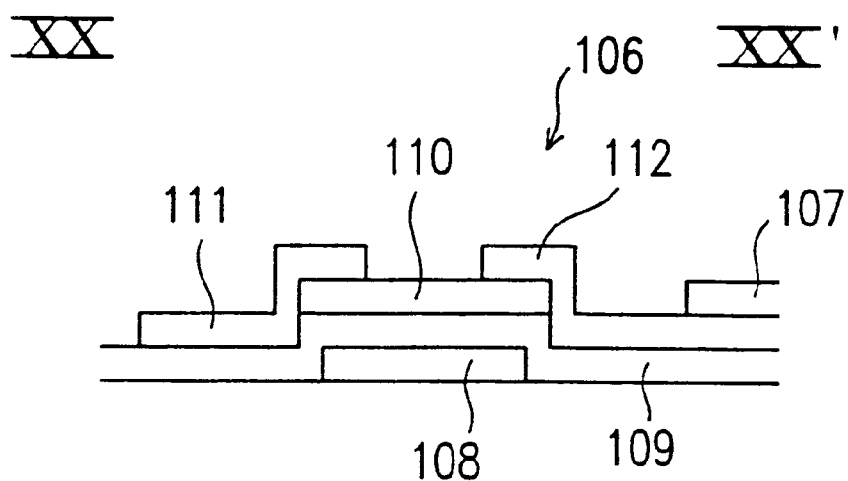
FIG. 20 is a cross-sectional view taken at line XX–XX' in FIG. 19.
Figure 21:
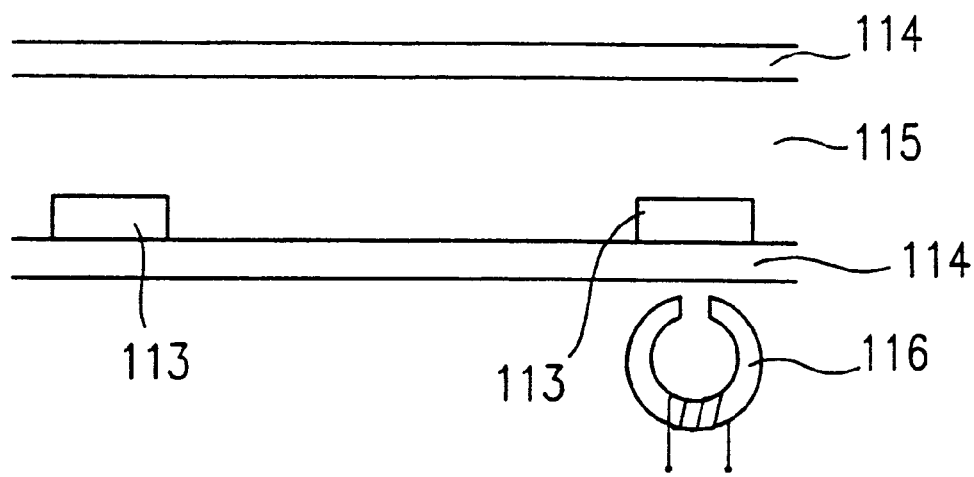
FIG. 21 is a cross-sectional view illustrating a conventional LC display device.

FIG. 16 is a plan view illustrating a LC display device 500 according to Example 5 of the present invention, where a counter substrate is omitted. FIG. 17 is a cross-sectional view taken at line XVII–XVII' in FIG. 16.

This LC display device 500 includes a LC layer 83 interposed between a matrix substrate 81 and a counter substrate 82, each substrate 81, 82 being composed of a light-transmitting substrate (e.g., glass). The structure of the LC display device 500 will be specifically described with reference to its manufacturing process.

On the matrix substrate 81, Cu is formed to a thickness of about 2000 angstroms by plating, followed by etching with a resist pattern using a proximity large-scale exposure technique, thereby forming row signal lines 84 (having a line width of 20 μm) and portions 85 of column signal lines (having a line width of 20 μm). Then, $Ta_2O_5$ is formed to a thickness of about 2500 angstroms by sputtering, followed by etching with a resist pattern using a proximity large-scale exposure technique, thereby forming a first insulative layer 87 with contact holes 86 therethrough.

Next, a layer of a Ni—Fe—Co type material or the like is deposited to a thickness of about 3000 angstroms by plating, followed by etching with a resist pattern using a proximity large-scale exposure technique, thereby forming the magnetic memory elements 88 (line width: 50 μm; length 1000 μm). Then, $Ta_2O_5$ is formed to a thickness of about 2500 angstroms by sputtering, followed by etching with a resist pattern using a proximity large-scale exposure technique, thereby forming a second insulative layer 90 with contact holes 86 therethrough.

Furthermore, Cu is formed to a thickness of about 2000 angstroms by plating, followed by etching with a resist pattern using a proximity large-scale exposure technique, thereby forming column signal lines 91 (having a line width of 20 μm) and portions 92 of row signal lines. Thereafter, a third insulative layer 93 of $Ta_2O_5$ is formed to a thickness of about 2500 angstroms by sputtering. Thus, the matrix substrate 81 is completed.

On the counter substrate 82, a light-shielding film 95 having apertures corresponding to respective pixels 94, where each pixel 94 is defined as a region surrounded by a magnetic memory element 88 on the matrix substrate 81. A color filter 96 is formed in the apertures.

Next, a polyimide alignment film (not shown) is printed on the respective surfaces of the matrix substrate 81 and the counter substrate 82, and subjected to a rubbing treatment. Thereafter, spherical spacers (not shown) are dispersed so as to retain an interspace between the matrix substrate 81 and the counter substrate 82. Thereafter, the substrates 81 and 82 are attached to each other, and sealed after injecting a LC material (e.g., same material as that used in Example 1) therebetween, whereby the LC layer 83 is obtained. Thus, the LC display device 500 according to the present example is completed.

As shown in FIG. 16, in the LC display device 500 having the above-described structure, the row signal lines 84 and 92 have a bent pattern including portions which are parallel to the column signal lines 85 and 91, respectively. The parallel portions of the row signal lines 92 and the column signal lines 85 are formed into a coil-like structure which is wound around the generally U-shaped magnetic memory element 88. In the present example, each pixel 94 is defined as a region surrounded by the corresponding magnetic memory element 88.

The method of writing to the magnetic memory element 88 and the operation principles of the LC layer according to Example 5 of the present invention are the same as in Example 4, and a desired state of magnetization can be written and retained in the magnetic memory element 88.

In Example 5, the patterning is performed by a photolithography process based on a proximity large-scale exposure technique. Although this results in somewhat poorer accuracy (e.g., about 10 μm) than the accuracy (e.g., about 1 μm) of a conventionally-employed high precision photolithography technique utilizing an exposure apparatus including a projection lens system and a stage having a high alignment accuracy, no display malfunctioning was observed in the LC display device of the present invention due to the accuracy problem.

The photolithography apparatus employed in the manufacturing process according to the present invention is inexpensive as compared to that employed in the prior art, and the processing time in the exposition step is multiple times smaller. Since sputtering or vapor deposition was used for some of the film formation apparatuses, the need for a PE-CVD apparatus (which is essential to the formation of TFTs under the prior art) is eliminated, thereby leading to a decrease in the cost of the apparatus and enhancement in processing ability.

Since line sequential scan driving is performed in the present example, the driving frequencies for the signals can be greatly reduced as compared to those required for point sequential scan driving, thereby making it possible to increase the delay margin for the signal lines of the LC display device. As a result, signal materials having relatively large resistance can be appropriately selected for the particular process, thereby making it possible to reduce the processing time owing to reduced film thicknesses of the wiring. Accordingly, the present example can easily accommodate high definition schemes, directed to larger size displays and a larger number of pixels, so that a LC display device with low costs and high performance can be easily realized.

According to the present example, the magnetization of the magnetic memory elements can be controlled to any value between 0 and the saturation magnetization Ms. Therefore, image display including gray scale display can be accomplished with good controllability. Since the orientation of the LC molecules can be made uniform, highcontrasted, excellent display quality is obtained.

Furthermore, since the row signal lines 84 and 92 and the column signal lines 85 and 91 according to Example 5 are formed into a coil-like structure, the magnetic field to be applied to the magnetic memory element 88 can be increased by using a small current value, whereby the power consumption of the LC display device can be reduced.

In general, as the size of the substrate increases, the cost incurred for manufacturing apparatuses and the processing time drastically increase. However, according to the present invention, which has been described with reference to Examples 1, 2, 3, 4, and 5 for illustrative purposes, inexpensive apparatuses can be used for performing the aforementioned simple processes with high processing ability. As a result, the manufacturing cost for large-size LC display devices can be drastically reduced according to the present invention.

Furthermore, according to the present invention, signals are retained in magnetic memory elements formed essentially of a ferromagnetic material, e.g., Fe, a Fe—Si type material, a Fe—Ni type material, a Fe—Ni—Co type material, $\gamma$-$Fe_2O_3$, or $CrO_2$. Therefore, the constraints concerning the resistivity of the LC layer are substantially eliminated, and reliability problems such as display unevenness arising due to an uneven distribution of charges within the LC layer can be overcome. Thus, excellent display quality and an improved yield are provided.

Although the row signal lines, the column signal lines, and the magnetic memory elements are all illustrated to be formed on one of the pair of substrates in the above examples, the present invention is not limited to such a construction. For example, the row signal lines and the column signal lines may be provided on different substrates, with the magnetic memory elements being formed on one of the substrates.

It is not necessary to interpose the LC layer between a pair of substrates according to the present invention. For example, the row signal lines, the column signal lines, and the magnetic memory elements may all be formed on one substrate, whereupon a film-like LC layer may be formed or a LC layer may be coated. As a result, a LC display device based only on a single substrate can be realized.

It is not necessary to employ glass substrates according to the present invention. For example, filmlike substrates formed of resin or the like can be suitably used.

The materials for the row signal lines, the column signal lines, and the shield electrodes can be Ta, Mo, Cr, W, Cu, Au or the like, in addition to those described in the above Examples. $SiN_x$, $Al_2O_3$ can alternatively be used for the insulative layers.

As the material for the magnetic memory elements, a ferromagnetic material or the like which is capable of retaining, i.e., memorizing, a magnetic field until a subsequent image signal is input. For example, a ferromagnetic material including Fe—Si, Fe—Ni, Fe—Al, Fe—Al—Si, Ni—Mn, Fe—Ta, Fe—B—C, Co—Pt, Co—Zr, Co—Cr, Fe—C, Fe—B, Fe—Si—B, Co—Fe—B, and/or a rare earth element, or a print material or coating material containing minute particles of $\gamma$-$Fe_2O_3$, $CrO_2$, and/or Fe can be used.

In the case where it is desirable to increase the magnetic susceptibility of the LC material as well, needle-like magnetic micropieces coated with a surfactant may be dispersed in the LC layer, for example.

In order to obtain display characteristics with excellent resolution, the magnetic susceptibility, deposition, and material of the magnetic memory element may be appropriately selected depending on the coercive force of the magnetic memory elements and the distance therebetween so as to prevent the magnetic fields generated by the magnetic memory elements from affecting the magnetization of one another.

The driving method for the LC display device according to the present invention is not limited to point sequential or line sequential scanning. For example, only the pixels for which there was a change in the image information may be scanned. It is also unnecessary to repeat scanning at a predetermined period. For example, by taking advantage of the excellent hold ability of the magnetic memory elements, a scanning signal may be fed only to those sets of rows and columns for which the image information changed (in the case of point scanning), or a scanning signal may be fed only to those rows for which the image information changed (in the case of line scanning). It is also applicable to perform intermittent scanning, where various signals are fed only during periods of time required for securing magnetization response so that each field will have a period when no signals are fed, thereby making it possible to stop scanning each time following a scan of the entire display. In this case, image information, especially image information encompassing little change, e.g., still images, can be displayed with low power consumption. Thus, driving methods which have been impossible with conventional LC display devices can be implemented, and selected in accordance with the type of image information.

Furthermore, the various aforementioned selections can be made in view of the size of the LC display device, the driving voltage, the driving current, the processing ability for various processes, the material cost, and the like.

As described above, conventional driving methods which are based on electric fields require a high precision patterning technique with an accuracy of e.g., about 1 $\mu$m or less; for example, a sophisticated photolithography process utilizing an exposure apparatus including a projection lens system is required, thereby making it difficult to reduce the manufacturing cost. In contrast, according to the present invention, LC can be driven by using substrates on which row signal lines, column signal lines, and magnetic memory elements are formed, so that only a patterning accuracy on the order of about 10 $\mu$m to about 100 $\mu$m is required. Therefore, proximity exposure lithography, printing, plating, and the like can be suitably employed despite their relatively poor patterning accuracy.

Since TFTs can be omitted according to the present invention, the insulative layers can be simply formed by a coating method.

Since the LC is driven by magnetic fields according to the present invention, the constraints concerning the resistivity of the LC layer are substantially eliminated, and display unevenness arising due to an uneven distribution of charges within the LC layer can be overcome.

As a result, the present invention reconciles great reduction in the manufacturing cost and improvement in the yield, thereby providing inexpensive LC display devices. In particular, the manufacturing cost will be drastically reduced when the present invention is applied to the production of large-size LC display devices.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising a liquid crystal layer, a row signal line, a column signal line, and a magnetic memory element, the row signal line and the column signal line being formed on one side or opposing sides of the liquid crystal layer, wherein magnetization of the magnetic memory element is controlled by a magnetic field generated by at least one of the row signal line and the column signal line to be in one of a magnetized state and a non-magnetized state, and a moment for driving the liquid crystal layer is generated by the magnetic memory element being retained in the magnetized state, thereby causing optical modulation in the liquid crystal layer.

2. A liquid crystal display device according to claim 1, wherein at least one of the row signal line and the column signal line is partially bent so as to have a parallel portion which is substantially parallel to the other of the row signal line and the column signal line, and the magnetic memory element is provided in a region within a range of a magnetic field generated by the parallel portion of the one of the row signal line and the column signal line and the other of the row signal line and the column signal line proximate the parallel portion.

3. A liquid crystal display device according to claim 1, wherein at least one of the row signal line and the column signal line is formed into a coil-like structure, and the magnetic memory element is provided in a region within a range of a magnetic field generated by the coil-5like structure of the at least one of the row signal line and the column signal line and the other of the row signal line and the column signal line proximate the coil-like structure.

4. A liquid crystal display device according to claim 2,
wherein the magnetic memory element is provided in one of a substantially parallel orientation to the parallel portion and a substantially perpendicular orientation to the parallel portion.

5. A liquid crystal display device according to claim 1,
wherein the magnetic memory element has one of a general U-shape, a general C-shape, and an angular C-shape.

6. A liquid crystal display device according to claim 5,
wherein at least one of the row signal line and the column signal line is partially bent so as to have a parallel portion which is substantially parallel to the other of the row signal line and the column signal line, and the magnetic memory element intersects the parallel portion in at least two positions.

7. A liquid crystal display device comprising a liquid crystal layer, a row signal line, a column signal line, and a magnetic memory element, the row signal line and the column signal line being formed on one side or opposing sides of the liquid crystal layer,
wherein magnetization of the magnetic memory element is controlled by a magnetic field generated by at least one of the row signal line and the column signal line to be in one of a magnetized state and a non-magnetized state,
a moment for driving the liquid crystal layer is generated by the magnetic memory element being retained in the magnetized state, thereby causing optical modulation in the liquid crystal layer, and
a shield electrode is formed in an inner periphery of a pixel defined as one of a region surrounded by two row signal lines and two column signal lines and a region within a range of a magnetic field generated by the magnetic memory element, the shield electrode blocking an electric field generated by the row signal line and the column signal line from reaching the pixel of the liquid crystal display.

8. A liquid crystal display device according to claim 1,
wherein the magnetic memory element has a thickness which is substantially equal to or greater than the thickness of the liquid crystal layer.

9. A liquid crystal display device according to claim 1,
wherein the magnetic memory element has a magnetization easy axis along a direction substantially perpendicular to the direction of a current flowing through at least a portion of the at least one of the row signal line and the column signal line that is controlling the magnetization of the magnetic memory element.

10. A method for driving the liquid crystal display device according to claim 1,
wherein the orientation of the liquid crystal molecules is controlled by controlling current values applied to the row signal line and the column signal line.

11. A method according to claim 10,
wherein a signal having a write period and a hold period is input to one of the row signal line and the column signal line, and an image signal is input to the other of the row signal line and the column signal line,
the write period being defined as a period during which a scanning signal is fed per at least one line defined as one of a row signal line and a column signal line, and the hold period being defined as a period other than the write period.

12. A method according to claim 11,
wherein the scanning signal includes an erase signal for erasing an image signal written into the magnetic memory element and a write signal for writing an image signal into the magnetic memory element.

13. A method according to claim 12,
wherein the erase signal includes a signal for applying to the magnetic memory element a magnetic field exceeding a saturation magnetization value of the magnetic memory element.

14. A method for according to claim 12,
wherein the write signal includes a signal for applying to the magnetic memory element a magnetic field that places the magnetic memory element substantially in the non-magnetized state.

15. A method according to claim 11,
wherein a hold signal is applied to said one of the row signal line and the column signal line during a hold period,
the hold signal including a signal which generates, when superimposed with an image signal that is input to the other of the row signal line and the column signal line during the hold period, a magnetic field not exceeding a coercive force of the magnetic memory element, and a signal that substantially minimizes change in the magnetization of the magnetic memory element.

16. A method according to claim 11,
wherein the image signal includes a signal which generates, when superimposed with a write signal input to said one of the row signal line and the column signal line, a magnetic field that controls the magnetization of the magnetic memory element.

17. A liquid crystal display device comprising a liquid crystal layer, a row signal line, a column signal line, and a magnetic memory element, the row signal line and the column signal line being formed on one side or opposing sides of the liquid crystal layer, one of the row signal line and the column signal line being a linear line while the other has a bent portion, and the row signal line and the column signal line having parallel portions which are substantially parallel to each other, the magnetic memory element being provided along the parallel portions, the magnetized state of the magnetic memory element being controlled by a magnetic field which is formed by at least one of the row signal line and the column signal line, wherein the optical modulation characteristic of the liquid crystal layer is controlled by the generation of a moment for driving the liquid crystal layer which is caused by the magnetic memory element retaining the magnetized state.

18. A liquid crystal display device comprising a liquid crystal layer, a row signal line, a column signal line, and a magnetic memory element, the row signal line and the column signal line being formed on one side or opposing sides of the liquid crystal layer, at least one of the row signal line and the column signal line having a bent portion, and the row signal line and the column signal line having parallel portions which are substantially parallel to each other, the magnetic memory element being partially superposed with the row signal line or the column signal line, the magnetized state of the magnetic memory element being formed by at least one of the row signal line and the column signal line, wherein the optical modulation characteristic of the liquid crystal layer is controlled by the generation of a moment for driving the liquid crystal layer which is caused by the magnetic memory element retaining the magnetized state.

19. A liquid crystal display device, comprising:

a first wiring portion including a first row signal line, a first column signal line provided in parallel with the first row signal line, and a first magnetic memory element, the magnetized state of the first magnetic memory element being controlled by a magnetic field which is formed by at least one of the first row signal line and the first column signal line;

a second wiring portion including a second row signal line, a second column signal line provided in parallel with the second row line, and a second magnetic memory element, the magnetized state of the second magnetic memory element being controlled by a magnetic field which is formed by at least one of the second row signal line and the second column signal line; and a liquid crystal layer provided in an area between the first wiring portion and the second wiring portion, wherein the optical anisotropic property of the liquid crystal layer is controlled by the magnetized state of the first magnetic memory element and the second magnetic memory element.

20. A liquid crystal display device, comprising:

first signal lines extending in a first direction;

second signal lines extending in a second direction and being bent to form second signal line portions that are parallel to the first signal lines, the first and second signal lines defining pixel regions each surrounded by two adjacent first signal lines and two adjacent second signal lines;

magnetic memory elements each having its magnetization controlled in accordance with magnetic fields generated by current flowing in at least one of a corresponding first signal line and in a corresponding second signal line portion; and a liquid crystal layer, wherein the orientations of the molecules of the liquid crystal layer in the pixel regions are determined in accordance with the magnetization of the magnetic memory elements.

21. A liquid crystal display device according to claim 20, wherein scanning signals are applied to the first signal lines and image signals are applied to the second signal lines.

22. A liquid crystal display device according to claim 20, further comprising:

shield electrodes for preventing electric fields generated by the first and second signal lines from affecting the molecules of the liquid crystal layer in the pixel regions.

23. A liquid crystal display device according to claim 22, wherein the shield electrodes are coupled to ground while voltages are applied to the first and second signal lines.

24. A liquid crystal display device according to claim 20, wherein the orientation of the molecules of the liquid crystal layer for each pixel region is determined in accordance with the magnetization of two separate magnetic memory elements spaced apart from each other in the second direction.

25. A liquid crystal display device according to claim 20, wherein the magnetic memory elements have uniaxial magnetic anisotropy.

26. A liquid crystal display device, comprising:

first signal lines extending in a first direction;

second signal lines extending in a second direction and being bent to form second signal line portions that are parallel to the first signal lines, the first and second signal lines defining pixel regions each surrounded by two adjacent first signal lines and two adjacent second signal lines;

U-shaped magnetic memory elements each having its magnetization controlled in accordance with magnetic fields generated by currents flowing in at least one of the first signal lines and in one of the second signal line portions parallel thereto, each U-shaped magnetic memory element having a first portion extending in the first direction and second and third portions extending in the second direction; and a liquid crystal layer, wherein orientations of the liquid crystal molecules in the pixel regions are determined in accordance with the magnetization of the U-shaped magnetic memory elements.

27. A liquid crystal display device according to claim 26, wherein the first signal lines and the second signal line portions parallel thereto are coiled around the magnetic memory elements.

28. A liquid crystal display device according to claim 26, wherein scanning signals are applied to the first signal lines and image signals are applied to the second signal lines.

* * * * *